US009633696B1

(12) United States Patent
Miller et al.

(10) Patent No.: US 9,633,696 B1
(45) Date of Patent: Apr. 25, 2017

(54) SYSTEMS AND METHODS FOR AUTOMATICALLY SYNCHRONIZING MEDIA TO DERIVED CONTENT

(71) Applicant: 3PLAY MEDIA, INC., Boston, MA (US)

(72) Inventors: Joshua Miller, Charlestown, MA (US); Andrew H. Schwartz, Jamaica Plain, MA (US); Anatole Khesin, Somerville, MA (US); Roger S. Zimmerman, Wellesley, MA (US); Christopher E. Johnson, Cambridge, MA (US); Christopher S. Antunes, Arlington, MA (US); Jeremy E. Barron, Boston, MA (US)

(73) Assignee: 3Play Media, Inc., Boston, MA (US)

( * ) Notice: Subject to any disclaimer, the term of this patent is extended or adjusted under 35 U.S.C. 154(b) by 0 days.

(21) Appl. No.: 14/725,920

(22) Filed: May 29, 2015

Related U.S. Application Data

(60) Provisional application No. 62/005,224, filed on May 30, 2014.

(51) Int. Cl.
*H04N 5/85* (2006.01)
*G11B 27/10* (2006.01)
*H04N 5/93* (2006.01)
*G10L 15/26* (2006.01)

(52) U.S. Cl.
CPC .......... *G11B 27/105* (2013.01); *G10L 15/265* (2013.01); *H04N 5/85* (2013.01); *H04N 5/9305* (2013.01)

(58) Field of Classification Search
None
See application file for complete search history.

(56) References Cited

U.S. PATENT DOCUMENTS

| 6,172,675 B1 | 1/2001 | Ahmad et al. | |
|---|---|---|---|
| 2010/0223128 A1* | 9/2010 | Dukellis | G06Q 30/0253 705/14.51 |
| 2012/0155658 A1* | 6/2012 | Tsunoo | G10L 25/48 381/57 |
| 2013/0060572 A1* | 3/2013 | Garland | G11B 27/10 704/254 |
| 2014/0105505 A1* | 4/2014 | Ioffe | G06K 9/4676 382/197 |

* cited by examiner

*Primary Examiner* — Eileen Adams
(74) *Attorney, Agent, or Firm* — Finch & Maloney PLLC

(57) ABSTRACT

A system for creating synchronized content is provided. The system includes a memory, at least one processor coupled to the memory, and a synchronization engine component executable by the at least one processor. The synchronization engine component is configured to locate a media file associated with synchronization information; locate at least one clip derived from the media file; generate a reference template representative of the media file; generate a derived content template representative of the at least one clip; align the derived content template with the reference template to create alignment information; and generate the synchronized content based on the at least one clip, the alignment information, and the synchronization information.

22 Claims, 12 Drawing Sheets

FIG. 11

SYSTEMS AND METHODS FOR AUTOMATICALLY SYNCHRONIZING MEDIA TO DERIVED CONTENT

RELATED APPLICATIONS

The present application claims priority under 35 U.S.C. §119(e) to U.S. Provisional Application 62/005,224, titled "SYSTEMS AND METHODS FOR AUTOMATICALLY SYNCHRONIZING MEDIA TO DERIVED CONTENT," filed on May 30, 2014, which is hereby incorporated herein by reference in its entirety. The present application relates to U.S. application Ser. No. 13/246,123 filed on Sep. 27, 2011 and titled "ELECTRONIC TRANSCRIPTION JOB MARKET," ("Electronic Transcription Job Market' application") which is hereby incorporated herein by reference in its entirety. The present application relates to U.S. application Ser. No. 13/426,339 filed on Mar. 21, 2012 and titled "INTELLIGENT CAPTION SYSTEMS AND METHODS," ("Intelligent Captions' application") which is hereby incorporated herein by reference in its entirety. The present application relates to U.S. application Ser. No. 13/589,801 filed on Aug. 20, 2012 and titled "METHODS AND SYSTEMS OF ASSOCIATING METADATA WITH MEDIA" ("'Metadata Media Associator' application"), which is hereby incorporated herein by reference in its entirety. The present application relates to U.S. application Ser. No. 14/508,866 filed on Oct. 7, 2014 and titled "AUTOMATED CAPTION POSITIONING SYSTEMS AND METHODS," ("Automated Caption Positioning' application") which is hereby incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

Technical Field

The technical field relates generally to transcription of content and, more particularly, to systems and methods for finding relationships between multiple portions of content.

Discussion

Media content (for example video and audio content) is becoming increasingly prevalent as a medium on the internet. For the hearing impaired, individuals with attention deficits, and non-native speakers of the language in which the video/audio content is recorded, this content presents significant challenges. Legislation and regulations often mandate that at least some of this content be made accessible to this population of consumers. Typically, content providers make available transcripts and captions of this content to assist this population, and to more generally (e.g. even with non-impaired users) increase engagement with the online media. Time-coded transcriptions of the content also make possible advanced capabilities such as the interactive transcript plugins and archive search plugins provided by 3Play Media of Cambridge, Mass.

In a typical use case, a content provider—or a third party—produces "clips" from an original media file. The clips are subsets of the original full length media file, often comprised of multiple sub-segments and often reordered for various purposes. Each contiguous sub-segment of the original media file may be referred to herein as a "clip." A collection of clips concatenated (in any order) into a new file may be referred to herein as a "clip reel."

Occasionally, clip reels may include additional footage (e.g. an introductory sequence), or the audio track or video track may be altered slightly (e.g. music added, voiceovers added, time expanded, text overlaid, profane language edited, commercial or product placement added). For example, clip reels may be made from a television show to create sharable video, "teasers," or other advertising vehicles. Or, clips of a university lecture may be produced to highlight a particular sub-topic discussed by the professor. As with the original (complete) media file, it is important that time-coded transcripts, captions, subtitles, annotations, semantic tagging, advertising, temporal metadata, and any other events that rely on the timeline be produced, as quickly as possible, for any clip reels derived from the original media file.

Presently, manual tools exist for producing clip reels and their associated synchronized transcripts and captions. For example, 3Play Media's "Clip Maker" tool enables users of the 3Play Media system to create clip reels from existing transcribed/captioned media files, using textual searching to identify salient regions, user interaction to select a set of regions, and then automatically extracting the video and audio sections from the original media file to create the clip reel. In this case, Clip Maker enables the user to directly control which sections of the original transcript and captions are extracted for the clip reel, and makes available to the user the time codes in the original media file. The user may then use the 3Play Media Timeshift API to extract the relevant portions of the transcript and or captions that were produced from the original media file, using the time codes from Clip Maker.

However, in a typical use case, the clip reels are produced independently of the original media file. For example, in the film industry, it is common for a teaser or advertising clip reel to be made from the original media file (e.g. a feature length film) in a video editor program such as Final Cut Pro (available from Apple, Inc.). Often this reel is produced by a third party such as an advertising department or firm, and this third party does not have access to the time-coded transcript or captions for the original media file. It would of course be possible for the clip reel to be processed separately by transcription and captioning services. However, this is expensive and time consuming, particularly as video programming providers and distributors already have many such clips and the number of clip reels increases.

SUMMARY

Embodiments disclosed herein address the problems described above by automatically (e.g., without human intervention) creating synchronized (time-coded or frame-coded) content derived from reference content. The reference content may include one or more full length media files. The derived content may include video frames, clips, and clip reels. The synchronized derived content may include video frames, clips, clip reels, transcripts, captions, subtitles, and other synchronized data. At least some features of these embodiments are included in the Video Clip Captioner, which is commercially available from 3Play Media.

In at least one embodiment, a system for creating synchronized content is provided. The system includes a memory, at least one processor coupled to the memory, and a synchronization engine component executable by the at least one processor. The synchronization engine component is configured to locate a media file associated with synchronization information; locate at least one clip derived from the media file; generate a reference template representative of the media file; generate a derived content template representative of the at least one clip; align the derived content template with the reference template to create alignment information; and generate the synchronized content based on the at least one clip, the alignment information, and the synchronization information.

In the system, the synchronization information may include information descriptive of at least one of a final transcription, a draft transcription, a caption frame, and a caption position. The synchronization information may include at least one of time codes and frame codes.

The system may further include a customer interface component configured to import the synchronization information from a system distinct from the system. The system may further include a market engine component, and the synchronization engine component may be further configured to transmit a request to the market engine component to generate the synchronization information.

In the system, the derived content template may include a first plurality of feature vectors and the reference template may include a second plurality of feature vectors. The synchronization engine component may be configured to align the derived content template with the reference template where a similarity metric between the first plurality of feature vectors and the second plurality of feature vectors transgresses at least one threshold value. The similarity metric may be at least one of a correlation coefficient and an average distance.

In the system, the first plurality of feature vectors may include a first group of feature vectors and a third group of feature vectors. The second plurality of feature vectors may include a second group of feature vectors and a fourth group of feature vectors. The threshold value may be a first distance that is less than a second distance, the first distance being between the first group and the second group, the second distance being between the third group and the fourth group.

In the system, the first plurality of feature vectors may include a first group of feature vectors and a third group of feature vectors. The second plurality of feature vectors may include a second group of feature vectors and a fourth group of feature vectors. The threshold value may be a first correlation coefficient that is greater than a second correlation coefficient, the first correlation coefficient being between the first group and the second group, the second correlation coefficient being between the third group and the fourth group.

In the system, the synchronization engine component may be configured to align the derived content template with the reference template at least in part by partitioning the derived content template into a plurality of template elements and aligning a template element of the plurality of template elements with the reference template where a similarity metric between the first plurality of feature vectors and the second plurality of feature vectors transgresses at least one threshold value. Each element template of the plurality of template elements may span a configurable length. The plurality of template elements may include at least one other template element comprising a third plurality of feature vectors. The reference template may include a fourth plurality of feature vectors. The synchronization engine component may be configured to align the derived content template with the reference template at least in part by concatenating the at least one other template element to the template element where a similarity metric between the third plurality of feature vectors and the fourth plurality of feature vectors transgresses the threshold value.

In the system, the synchronization engine component may be further configured to concatenate the at least one other template element to the template element in a location before to the template element. The synchronization engine component may be further configured to concatenate the at least one other template element to the template element in a location after the template element. The synchronization engine component may be further configured to initiate generation of caption frames based on the synchronized content. The synchronization engine component may be further configured to initiate generation of caption positioning information based on the caption frames.

In the system, the at least one clip may include added content omitted from the media file. The synchronization engine component may be further configured to initiate generation of at least one of a synchronized transcription, caption frames, and caption positioning information for the added content. The synchronization engine component may be further configured to generate a confidence document including a score indicating whether the synchronized content is correct. The synchronization engine component may be further configured to determine whether the score transgressed a threshold value and to either transmit the synchronized content in response to determining that the score transgressed the threshold value or initiate editing of the synchronized content in response to determining that the score transgressed the threshold value.

In another embodiment, a method for creating synchronized content using a computer system is provided. The method includes acts of executing a synchronization engine component; locating, by the synchronization engine component, a media file associated with synchronization information; locating, by the synchronization engine component, at least one clip derived from the media file; generating, by the synchronization engine component, a reference template representative of the media file; generating, by the synchronization engine component, a derived content template representative of the at least one clip; aligning, by the synchronization engine component, the derived content template with the reference template to create alignment information; and generating, by the synchronization engine component, the synchronized content based on the at least one clip, the alignment information, and the synchronization information. Other embodiments of the method may include any combination of the acts disclosed herein.

In another embodiment, a non-transitory computer readable medium storing sequences of computer executable instructions for creating synchronized content is provided. The sequences of computer executable instructions include instructions that instruct at least one processor to execute a synchronization engine component; locate, by the synchronization engine component, a media file associated with synchronization information; locate, by the synchronization engine component, at least one clip derived from the media file; generate, by the synchronization engine component, a reference template representative of the media file; generate, by the synchronization engine component, a derived content template representative of the at least one clip; align, by the synchronization engine component, the derived content template with the reference template to create alignment information; and generate, by the synchronization engine component, the synchronized content based on the at least one clip, the alignment information, and the synchronization information. Other embodiments of the computer readable medium may store instructions to execute any combination of the computer-executable acts disclosed herein.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 11 is a text view of one example confidence document; and

DETAILED DESCRIPTION

Figure 1:
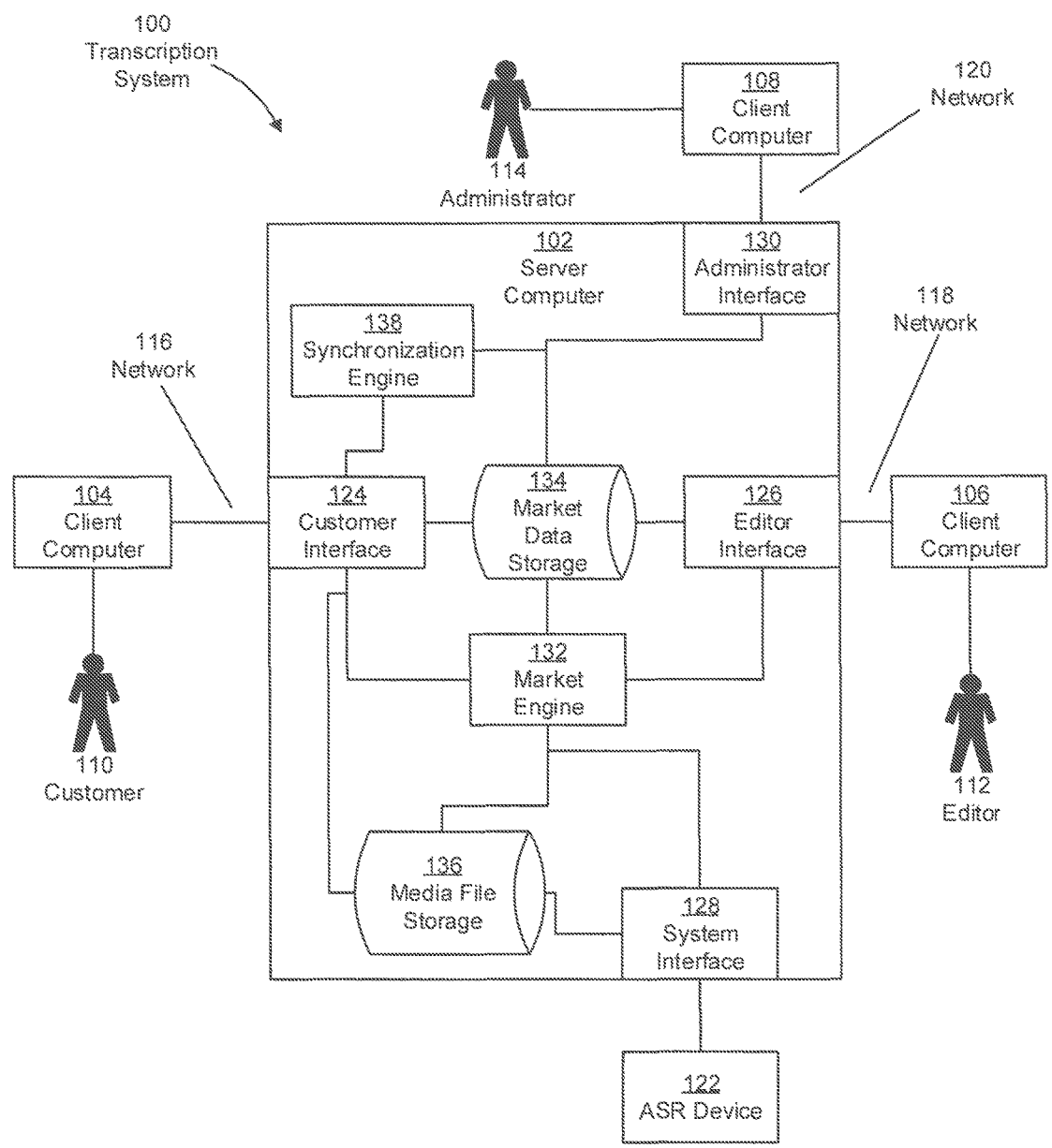
FIG. 1 is a context diagram including an exemplary transcription system.

At least one embodiment disclosed herein includes apparatus and processes for implementing, using a computer system, a transcription job market. In some embodiments, the transcription job market receives transcription request information from customers that identifies media files with encoded audio content that the customers seek to have transcribed. In these embodiments, the transcription job market creates and posts jobs associated with the media files.

In other embodiments, the transcription job market manages market elements to ensure that jobs are being completed according to schedule and with quality. These market elements may include one or more attributes of one or more jobs. In some embodiments, the transcription job market receives information from editors that identifies jobs that the editors seek to complete. In these embodiments, the transcription job market further provides tools used by the editors to complete their transcription tasks. These tasks may produce transcriptions that are synchronized and transcriptions that lack time-coding or frame-coding, i.e., are "synchronized."

Other embodiments include a synchronization engine that synchronizes content derived from reference content. The reference content may include one or more media files. The derived content may include one or more clips or clip reels as described above. In some embodiments, the synchronization engine generates synchronized transcription products based on the location of the derived content within the one or more media files. These transcription products may include transcriptions, captions frames (such as those described in the "Intelligent Captions" application and the "Automated caption positioning" application), and captions encoded within the derived content (for example, a copy of a clip uploaded to the system).

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Transcription System

Various embodiments implement a transcription system using one or more computer systems. FIG. 1 illustrates one of these embodiments, a transcription system 100. As shown, FIG. 1 includes a server computer 102, client computers 104, 106, and 108, a customer 110, an editor 112, an administrator 114, networks 116, 118 and 120, and an automatic speech recognition (ASR) device 122. The server computer 102 includes several components: a customer interface 124, an editor interface 126, a system interface 128, an administrator interface 130, a market engine 132, a market data storage 134, a media file storage 136, and a synchronization engine 138.

As shown in FIG. 1, the system interface 128 exchanges (i.e. sends or receives) media file information with the ASR device 122. The customer interface 124 exchanges information with the client computer 104 via the network 116. The editor interface 126 exchanges information with the client computer 106 via the network 118. The networks 116, 118 and 120 may include any communication network through which computer systems may exchange information. For example, the network 116, the network 118, and the network 120 may be a public network, such as the internet, and may include other public or private networks such as LANs, WANs, extranets and intranets.

Information within the transcription system 100, including data within the market data storage 134 and the media file storage 136, may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance. In one embodiment, the media file storage 136 includes a file system configured to store media files and other transcription system data and acts as a file server for other components of the transcription system. In another embodiment, the media file storage 136 includes identifiers for files stored on another computer system configured to serve files to the components of the transcription system.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and a) passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Figure 8:
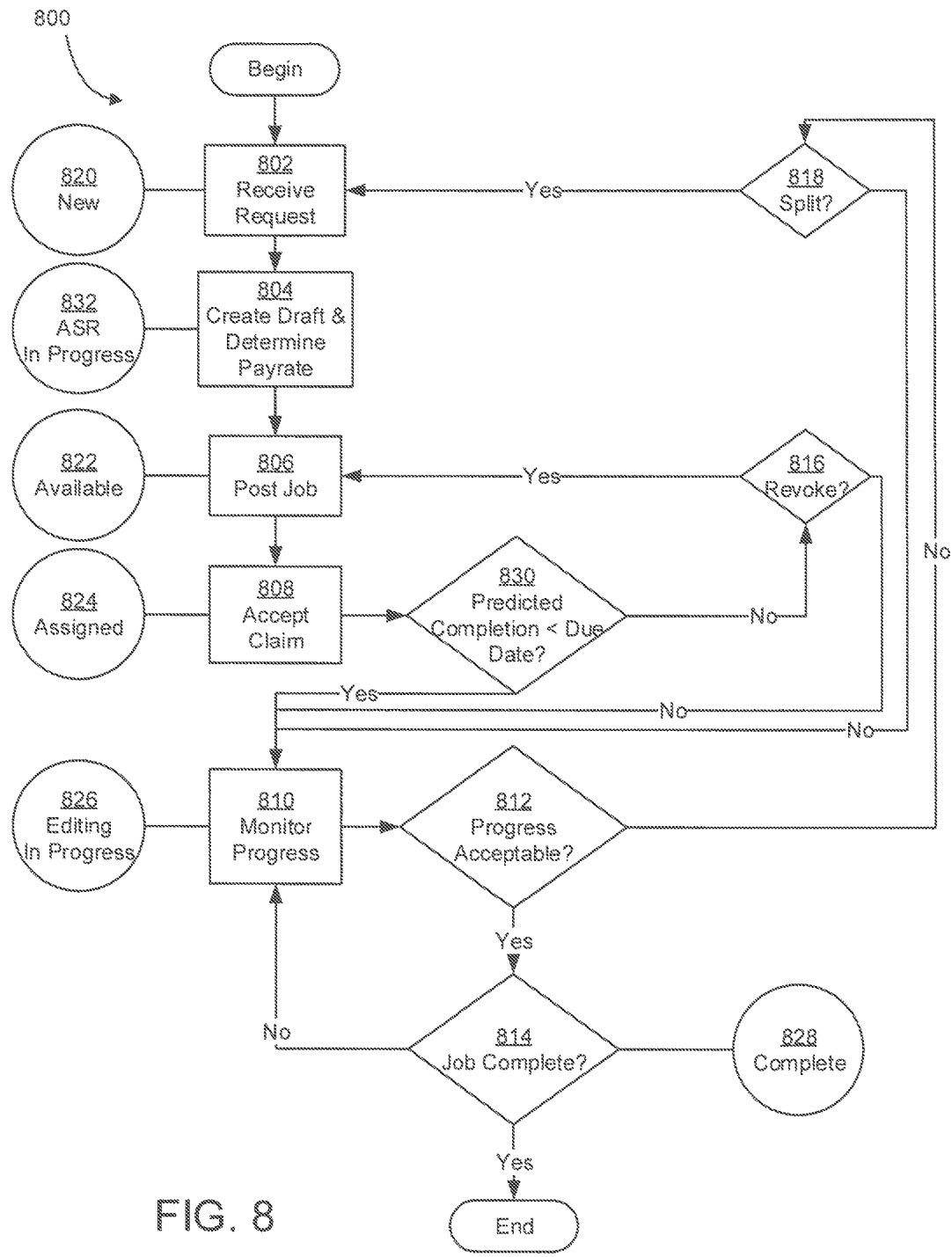
FIG. 8 is a flow diagram illustrating states assumed by a transcription job during execution of an exemplary transcription system.

One goal of the transcription system 100 is to receive media files from customers and to provide both final and intermediate transcriptions of the content included in the media files to the customers. One vehicle used by the transcription system 100 to achieve this goal is a transcription job. Within the transcription system 100, transcription jobs are associated with media files and are capable of assuming several states during processing. FIG. 8 illustrates an exemplary process 800 during the execution of which a transcription job assumes several different states.

As shown in FIG. 8, the process 800 begins when the transcription system 100 receives transcription request information that identifies a media file to transcribe in act 802. The transcription request information may also include delivery criteria that specifies a schedule (e.g., one or more delivery times), quality levels, or other criteria defining conditions to be satisfied prior to delivery of transcription products. In some embodiments, the transcription system 100 receives the transcription request information and the media file via an upload from a customer interface, such as the customer interface 124, or as a result of a previously received media file being split, per act 818 below. Upon receipt of the transcription request information and the media file, the transcription system 100 creates a job, associates the job with the media file, and sets the job to a new state 820. In act 804, the transcription system 100 sets the job to an ASR in progress state 832, generates draft transcription information, and determines a pay rate for the job. When executing the act 804, some embodiments track completion percentage of the draft transcription during ASR processing. Record of completion percentage is used to execute subsequent delivery processes where ASR processing is not complete due to the schedule or interruption by another delivery request. Further, these embodiments compute one or more metrics that characterize the quality of the draft transcription. Draft transcriptions may be full transcriptions or partial transcriptions (where ASR processing is not completed). Some embodiments incorporate information descriptive of the completion percentage and quality metrics into the draft transcription information.

In act 806, the transcription system 100 posts the job, making the job available for editors to claim, and sets the job to an available state 822. Jobs in the available state correspond to draft transcriptions that have completed full or partial ASR processing. As described further below, in some embodiments in accord with FIG. 8, the transcription system 100 monitors the due dates and times of available jobs and, if necessary, alters the pay rate (or other job characteristics) of the available jobs to ensure the available jobs are completed by the due date and time.

In act 808, the transcription system 100 accepts an offer by an editor to claim the job and sets the job to an assigned state 824. In the illustrated embodiment, jobs in the assigned state 824 are not available for claiming by other editors. In act 830, the transcription system 100 determines whether the predicted completion date and time for the job, as assigned, occurs before the due date and time. If so, the transcription system 100 executes act 810. Otherwise the transcription system 100 executes act 816.

In the act 816, the transcription system 100 determines whether to revoke the job. If so, the transcription system executes the act 806. Otherwise, the transcription system 100 executes the act 810.

In the act 810, the transcription system 100 records and monitors actual progress in transcribing the media file associated with the job, as the progress is being made by editors. Also in the act 810, the transcription system 100 sets the job to an editing in progress state 826. In the act 812, the transcription system 100 determines whether the job is progressing according to schedule. If so, the transcription system executes act 814. Otherwise, the transcription system executes act 818.

In the act 818, the transcription system 100 determines whether to split the media file associated with the job into multiple media files. For example, the transcription system may split the media file into one segment for any work already completed and into another segment for work yet to be completed. This split may enable the transcription system 100 to further improve the quality on a segment by segment basis. For example, a segment which has been edited may be split from other segments so that the edited segment may proceed to quality assurance (QA). Thus splitting the media file may enable the transcription system to provide partial but progressive delivery of one or more transcription products to customers. If the transcription system 100 splits the media file, the transcription system 100 stores the edited, completed segment and executes the act 802 for any segments that include content not completely transcribed. If, in the act 818, the transcription system 100 determines to not split the media file, the transcription system 100 executes the act 810.

In the act 814, the transcription system 100 determines whether the content of the media file associated with the job is completely transcribed. If so, the transcription system 100 stores the edited, complete transcription and sets the state of the job to a complete state 828, and the process 800 ends. Otherwise, the transcription system 100 executes the act 810.

In some embodiments, completed transcriptions may be the subject of other jobs, such as QA jobs, as described further below. Components included within various embodiments of the transcription system 100, and acts performed as part of the process 800 by these components, are described further below.

According to various embodiments illustrated by FIG. 1, the market engine 132 is configured to both add jobs to the transcription job market provided by the transcription system 100 and to maintain the efficiency of the transcription job market once the market is operational. To achieve these goals, in some embodiments, the market engine 132 exchanges market information with the customer interface 124, the administrator interface 130, the editor interface 126, the system interface 128, the market data storage 134, the media file storage 136, and the synchronization engine 138. Market information may include any information used to maintain the transcription job market or stored within the market data storage 134. Specific examples of market information include media file information, job information, customer information, editor information, administrator information and transcription request information. Each of these types of information is described further below with reference to FIG. 2.

In some embodiments, the synchronization engine 138 is configured to synchronize derived content (e.g. video frames, clips, or clips reels) with one or more media files. When executing according to this configuration, the synchronization engine 138 exchanges market information with customer interface 124, the market engine 132, the market data storage 134 and the media file storage 136.

In some examples, the synchronization engine 138 is configured to receive notifications from other components of the transcription system 100, such as the customer interface 124 and the market engine 132. These notifications may include transcription request information and may describe the status and location of transcription information corresponding to the one or more media files being processed by the transcription system 100. As described further below, transcription information may include textual representations of audio information associated with a media file and may include or be associated with synchronization information (e.g., codes indicating a time or a video frame during which the audio information associated with the textual representation is output). For instance, these notifications may indicate that the transcription information includes final transcription information, draft transcription information, or segments thereof. In some embodiments, in response to receiving notifications, the synchronization engine 138 may take one of several actions as specified by previously received parameters and the transcription request information.

In other examples, the synchronization engine 138 does not receive notifications regarding transcription information availability. In these examples, the synchronization engine 138 periodically scans the market data storage 134 and the media file storage 136 to determine whether transcription information is available for processing. Where the synchronization engine 138 detects transcription information targeted for synchronization via this periodic scan, the synchronization engine 138 may take one of several actions as specified by previously received parameters and the transcription request information.

In some examples, the synchronization engine 138 is configured to receive transcription request information including an automatic synchronization request that identifies final transcription information generated prior to receipt of the transcription request information. For example, the transcription request information may include an automatic synchronization request that identifies a clip derived from a media file associated with the final transcription information. This final transcription information may have been generated by the transcription system 100 via the process 800. Alternatively, this final transcription information may have been generated by some other system and uploaded (or "imported) into the transcription system via the customer interface 124.

To process the transcription request information, the synchronization engine 138 may generate templates of the one or more media files and the derived content, align the templates, generate a synchronized version of the derived content, and generate transcription products using the synchronized derived content and other associated transcription information. These transcription products may include transcriptions (e.g., synchronized and non-synchronized), captions frames (such as those described in the "Intelligent Captions" application and the "Automated caption positioning" application), captions encoded in media files (for example, a copy of the media file uploaded to the system), and auxiliary deliverables such as search keywords, semantic tags, annotations, subtitles, descriptive summarization, and other metadata derived either automatically or manually from the transcription information. These auxiliary products may be derived automatically from the synchronized derived content at any stage using natural language processing algorithms, such as TextRank, GRASSHOPPER, and maximum entropy modeling. The auxiliary deliverables may be used on web-sites to optimize for search engine ranking of the page by, for example, directly encoding the auxiliary deliverables into the HTML that constitutes the web-sites.

In some embodiments the synchronization engine 138 produces caption frames from the synchronized derived content via natural language processes as described in the "Intelligent Captions" application. These processes, when executed by the synchronization engine 138, determine syntactic boundaries, for example sentence and paragraph boundaries. The synchronization engine 138 may convert caption frames into various caption formats for embedding internet-based media players, or may include the caption frames directly into a version of the original media file to provide open or closed caption playback for the media file.

Figure 11:
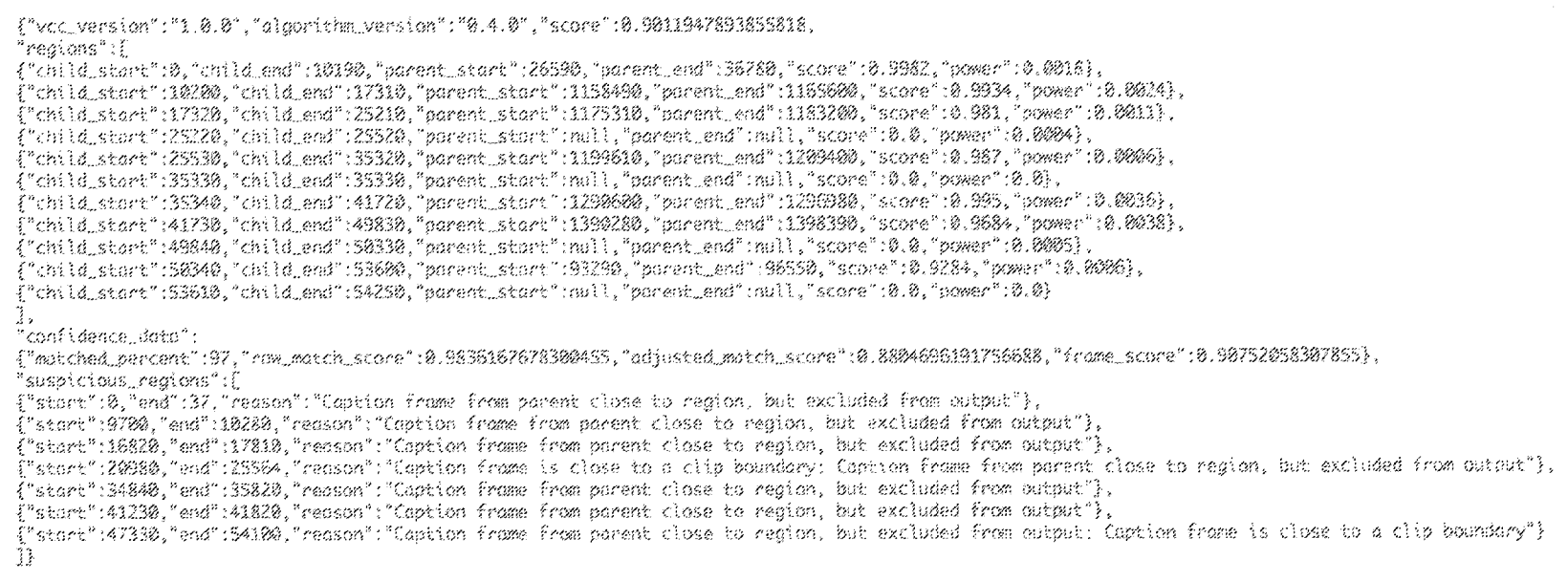

In some embodiments, the synchronization engine 138 is configured to generate information descriptive of the quality level achieved by its synchronization process. For instance, in one example, the synchronization engine 138 generates a confidence document (for example, a json document) that is stored in association with the synchronized derived content to indicate the degree to which the automated synchronization process results in properly aligned and valid synchronized derived content. FIG. 11 illustrates one example of a confidence document. Elements of this document may include an overview of confidence scores associated with each stage of the synchronization process, an overall score, a specific list of time points for identified problematic areas, metadata associated with each matched region and each unmatched region, and a listing of matched time regions showing correspondence between the reference content file times and associated times in the derived content as determined by the synchronization process.

In some examples, the overview of confidence scores includes distances measured between a reference template and a derived content template for each contiguous region. In these examples, the reference template is representative of the one or more media files and the derived content template is representative of the content derived from the one or more media files. In other examples, the overview of confidence scores includes the total percentage of the derived content matched to the reference content and a summary of scores for each transcript element or caption frame included in the output. The summary of scores indicates the quality of the match with regard to each transcript element or caption frame. For example, a caption frame might contribute a low score if it includes a sentence that was cut in half by the estimated match.

In some examples, the overall score within the confidence document represents a single value of confidence for the generated transcription products. In other examples, the specific list of time points for identified problematic areas includes, for example, regions with low match scores or with caption frames that are split by a matched region boundary. This list can be used for a quick review of the output.

In some examples, the metadata associated with each matched region (e.g., where the reference content time points are non-null) and each unmatched region (e.g., where the reference content time points are null) region includes individual match scores for each region, average acoustic power in each region, and estimates of the amount of speech in each region based on audio and image processing of these regions. In some examples, the average acoustic power in an unmatched region is used to determine the contribution of the unmatched duration to the scores described above. For instance, if an unmatched region in the derived content has very low power, it may not penalize the score significantly. However, if an unmatched region has high power, the fact that no match was found in the reference content might cause the score to be decreased.

Figure 12:
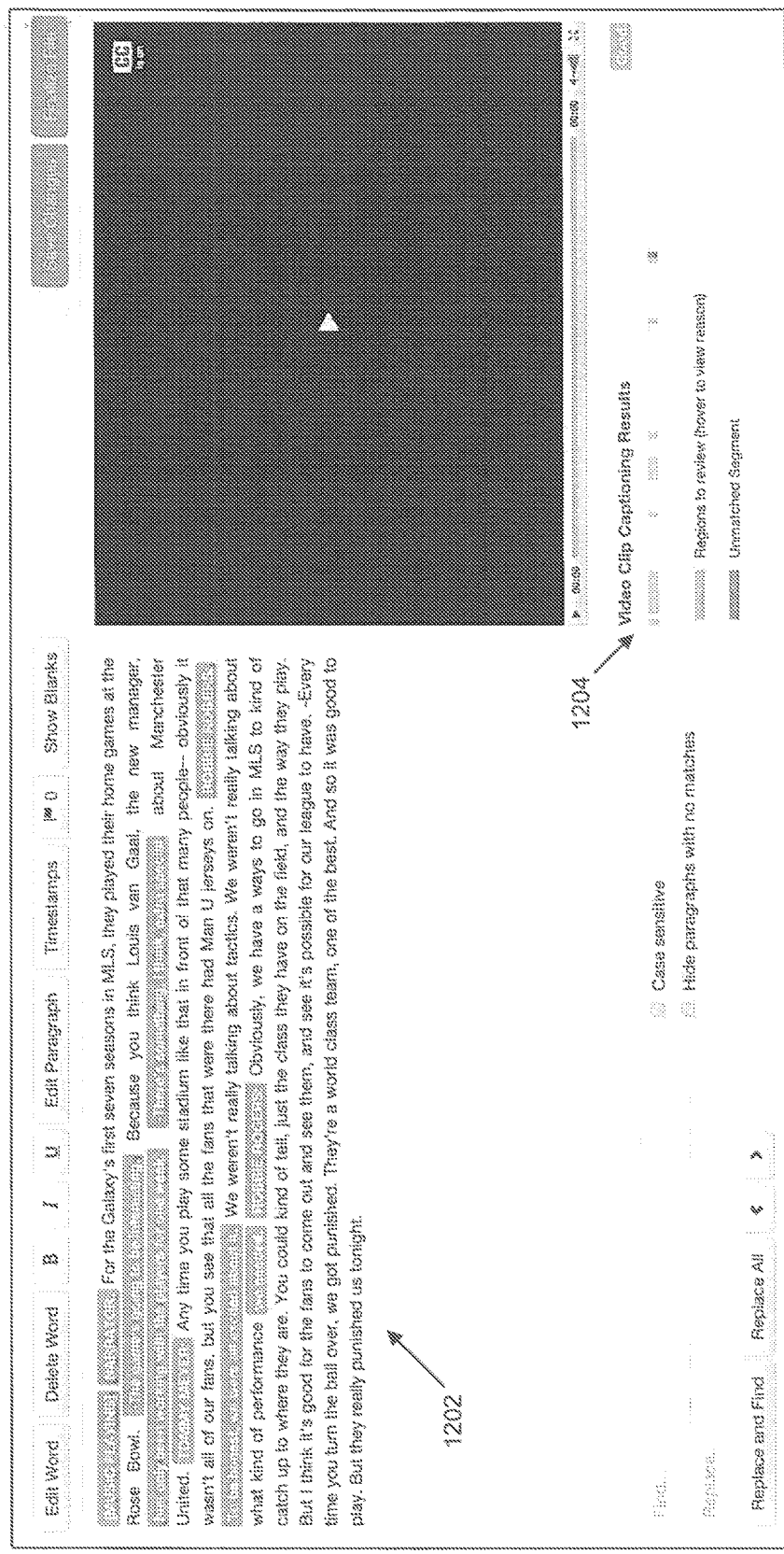
FIG. 12 is an illustration of an example user interface screen provided in some examples.

In some embodiments, the synchronization engine 138 is configured to utilize the quality information included in the confidence document to execute further processing. For example, if the overall confidence score is above a first threshold value, the synchronization engine 138 may publish the synchronized derived content. This publication may include, for example, automatic transmission of the synchronized derived content to the customer's system or web page, as described further below. Alternatively, if the overall confidence score is below a second threshold value, the synchronization engine 138 may submit the synchronized derived content to the transcription workflow (process 800) of the transcription system 100. Otherwise, if the first threshold value is distinct from the second threshold value and the confidence score is between the first threshold value and the second threshold value, the synchronization engine 138 may prompt a user to examine or modify the synchronized derived content using a tool such as 3Play Media's clip captioning editor. FIG. 12, which is described further below, illustrates a screen presented by the customer interface 124 when executing the clip captioning editor. The first threshold value and second threshold values may be specified by a configurable parameter in the transcription system 100, transcription request information or a combination of both. The annotations and other information in the confidence document may be used to facilitate this editing process. In some examples, the customer interface 124 may automatically download the confidence document (e.g. using an HTTP API request, or a parameter to the same request by which the synchronized derived data is downloaded) to facilitate automation of various process, such as those described above.

In some embodiments, the synchronization engine 138 is configured to automatically transmit transcription products by embedding the transcription products directly onto a web page, for example by modifying plugin HTML code to point to the updated resource URL or executing an HTTP API to modify the web page HTML code. In other embodiments, the synchronization engine 138 is configured to transmit the transcription products to an FTP folder specified in the transcription request information or a configurable parameter.

While the synchronization engine 138 is illustrated as a component distinct from the market engine 132 in FIG. 1, it is appreciated that the synchronization engine 138 may be incorporated into the market engine 132 according to some embodiments. In addition, processes executed by the synchronization engine 138 according to various embodiments are described further below with reference to FIG. 9.

In some embodiments, the market engine 132 is configured to identify unprocessed media files stored in the media file storage 136. In some of these embodiments, the market engine 132 identifies unprocessed media files after receiving an indication of the storage of one or more unprocessed media files from another component, such as the customer interface 124, which is described further below. In others of these embodiments, the market engine 132 identifies unprocessed media files by periodically executing a query, or some other identification process, that identifies new, unprocessed media files by referencing information stored in the market data storage 134 or the media file storage 136. In some embodiments, the market engine 132 is also configured to send a request for ASR processing of unprocessed media files to the system interface 128. This request may include information specifying that only a limited portion of the unprocessed media file (e.g., a specified time period) be processed. Further, in at least one embodiment, the market engine 132 tracks completion percentage of the draft transcription during subsequent ASR processing. The market engine 132 may store, in the market data storage 134, the completion percentage associated with partial transcriptions stored in the media file storage 136.

In these embodiments, the system interface 128 is configured to receive requests for ASR processing, and, in response to these requests, provide the unprocessed media files to the ASR device 122, along with any requested limits on the ASR processing. The ASR device 122 is configured to receive a media file, to perform transcoding and automatic speech recognition on the received media file in accord with the request and to respond with draft transcription information that includes a draft (synchronized or non-synchronized) transcription of the content of the received media file and a predicted cost of editing the draft transcription. This predicted cost, referred to herein as the ASR_cost is based on information computed as part of the ASR processing and a cost model. The cost model may be a general model or may be associated with the project, customer or editor associated with the media file. A project is a set of media files grouped by a customer according to domain, due date and time or other media file attribute. Projects are described further below. Cost models predict the cost of editing a draft transcription and are described further with reference to FIG. 2 below. The system interface 128 is further configured to receive the draft transcription information, store the draft transcription information in the media file storage 136, store the location of the draft transcription information in the market data storage 134, and notify the market engine 132 of the availability of the draft transcription information.

In one example illustrated by FIG. 1, the market engine 132 receives an identifier of a newly stored media file from the customer interface 124. Responsive to receipt of this identifier, the market engine 132 provides a request to perform ASR processing on the media file to the system interface 128. The system interface 128, in turn, retrieves the media file from the media file storage 136 and provides the media file, along with a set of parameters that indicate appropriate language, acoustic, cost and formatting models, to the ASR device 122. The ASR device 122 responds with draft transcription information that includes a synchronized draft transcription, lattices, search statistics, ASR_cost and other associated data. The system interface 128 receives the draft transcription information, stores the draft transcription information in the media file storage 136, stores the location of the draft transcription information in the market data storage 134 and notifies the market engine 132 of the availability of the draft transcription information.

In other embodiments, the market engine 132 is configured to perform a variety of processes in response to receiving a notification that draft transcription information is available. For instance, in one example, after receiving a notification that draft transcription information is available, the market engine 132 notifies the synchronization engine 138 that draft transcription information is available by providing the synchronization engine 138 with a notification describing the location and status of the draft transcription information. In other examples, the market engine 132 does not notify the synchronization engine 138 of draft transcription information availability. In these examples, the synchronization engine 138 periodically scans the market data storage 134 and the media file storage 136 to determine whether draft transcription information is available for processing. In another example, the market engine 132 employs natural language processing techniques to determine the type of content or domain included in the media file associated with the draft transcription information and stores this information in the market data storage 134. In another example, the market engine 132 determines the duration of the content included in the media file and stores the duration in the market data storage 134. In another example, after receiving a notification that draft transcription information is available, the market engine 132 determines an initial pay rate for editing the draft transcription included in the draft transcription information and stores job information associated with the draft transcription in the market data storage 134. In this example, the initial pay rate included in the job information is determined using the due date and time, difficulty, duration, domain and ASR_cost of the media file associated with the draft transcription information. In other examples, other combinations of these factors may be used, or these factors may be weighted differently from one another. For instance, in one example, due date and time and duration may be replaced with times-real-time. In another example, the weight applied to any particular factor may be 0.

In other embodiments, the market engine 132 is configured to periodically publish, or "push," notifications to editors that indicate the availability of new jobs. In one of these embodiments, the market engine 132 tailors these notifications by sending them only to particular editors or groups of editors, such as those editors who have permission to edit the jobs. In other embodiments, the market engine 132 tailors notifications based on other job characteristics, such as the type of job (editing, QA, etc), difficult, domain or due date and time. In some examples, the market engine 132 sends notifications to editors based on their ability to complete jobs having the attribute to which that the notification is tailored. Continuing the previous examples, the market engine 132 may send notifications to editors who may assume particular roles (editor, QA, etc.), who have a track record of handling difficult jobs, who are well versed in a particular domain, or who are highly efficient.

In at least one embodiment, the market engine 132 notifies editors of near-term future job availability based on the upstream workflow. In this embodiment, as files are uploaded by customers and processed by the ASR device, the market engine 132 predicts how many more jobs will be available and based on one or more the attributes of these jobs, such as duration, domain, etc., the market engine 132 sends out advanced notice to one or more editors via the editor interface 126.

In other embodiments, the market engine 132 is configured to determine the difficulty of successfully editing the draft transcription and to store the difficulty in the market data storage 134. In these embodiments, the market engine 132 may base this determination on a variety of factors. For example, in one embodiment, the market engine 132 calculates the difficulty using an equation that includes weighted variables for one or more of the following factors: the content type (domain) of the media file, the historical difficulty of media files from the customer (or the project), the draft transcription information, and acoustic factors (such as noise-level, signal-to-noise-ratio, bandwidth, and distortion).

In some embodiments, the market engine 132 is configured to create and post jobs corresponding to unedited media files, thereby making the jobs available to the editors for claiming and completion. According to one example, as part of this processing, the market engine 132 stores an association between each job and a media file targeted for work by the job. This action is performed so that factors affecting pay rate, such as those described above, can be located in a media file table.

As described further below with reference to the editor interface 126, editors claim jobs by indicating their preferences on a user interface provided by the editor interface 126. After a job is claimed, the job is removed from the market, so that no other editors can access the job. However, until the editor has actually begun to edit the job, it is relatively easy for the job to be put back on the market. Typically, leaving the original claim in place is preferred. However, in some embodiments, the market engine 132 is configured to determine whether the editor who claimed the job will be able to complete the job before the due date and time. In these embodiments, the market engine 132 is configured to make this determination based on the job characteristics (difficulty, domain, duration, etc.) and the editor's historical proficiency as stored in the market data storage 134. For example, the editor may be associated with a times-real-time statistic stored in the market data storage 134. The times-real-time statistic measures editor productivity and is calculated by dividing the time it takes for the editor to complete each job by the duration of the media file associated with each job. In some embodiments, the market engine 132 is configured to use this statistic to estimate the completion time of the job (based on duration multiplied by times-real-time). In some embodiments, the market engine 132 is configured to condition this statistic based on job attributes, and thus compute the statistic from similar jobs performed by the editor in the past. The set of historical jobs used to compute the times-real-time statistic may include all jobs performed by the editor, a subset of jobs which have similar attributes to the present job, or other combinations of historical jobs, including those that were not performed by the editor. The market engine 132 may calculate this statistic as a mean, a median, a duration-weighted mean, or using summaries of historical processing times for the editor or other editors for different media file subsets.

In other embodiments, if the market engine 132 determines that an editor may be unlikely to complete a job before the due date and time, the market engine 132 may reverse the assignment and put the job back on the market, thus allowing some number of other editors to claim the job. In some these embodiments, the market engine 132 determines the likelihood that the editor will complete the job before its due date and time using one or more of the following factors: historical productivity of the editor (in general or, more specifically, when editing media files having a characteristic in common with the media file associated with the job); the number of jobs currently claimed by the editor; the number of jobs the editor has in progress; and the due dates and times of the jobs claimed by the editor. When the market engine 132 reverses an assignment, the original editor is informed of this condition via the editor interface 126. The market engine 132 may or may not allow the original editor to reclaim the job from the market, depending on whether data indicates interest of other editors in the job. One example of an indicator of interest is whether the job is being previewed by any other editors. Another factor which may influence this decision is if the total volume of unedited draft transcriptions exceeds a threshold.

In some embodiments, the market engine 132 determines a likelihood of completion for each possible combination of editor and job. In these embodiments, the market engine 132 may calculate this likelihood using any combination of the factors discussed above (historical productivity, number of jobs claimed, number of jobs in progress, due dates and times of claimed jobs, etc.). Further, in some embodiments, the market engine 132 prevents editors from claiming jobs for which the editor's likelihood of completion metric transgresses a threshold. In these embodiments, the threshold is a configurable parameter. Further, according to these embodiments, the market engine 132 may prevent an editor from claiming a job in a variety of ways including rejecting an offer from the editor to claim the job and causing the job to not be display to the editor within the editor interface 126 via, for example, a meta rule. Meta rules are discussed further below.

In other embodiments, if the market engine 132 determines that an editor may be unlikely to complete a job before the due date and time, the market engine 132 sends a notification to the editor who claimed the job via the editor interface 126. The notification may include a variety of information, such as a notification that the job may be revoked shortly or including a link to allow the editor to voluntarily release the job.

In several embodiments, the market engine 132 is configured to give permission to many editors to edit the same draft transcription and to offer all editors the same pay rate to do so. In some alternative embodiments, however, the market engine 132 is configured to determine if, based on historical information, some editors display an increased proficiency with particular types of media files (for example in certain domains) and to increase the pay rate for these editors when transcribing media files having the particular type. In addition, some embodiments of the market engine 132 are configured to adjust the pay rate based on overall editor experience levels, as well as the historical productivity of the editors, both in general and on the type of media file for which the rate is being set.

In general, the market engine 132 sets the pay rate based on the aforementioned factors, such as job difficulty, required times-real-time, and ASR_cost. However, to maintain an efficient market in some embodiments, the market engine 132 is configured to determine when market conditions suggest intervening actions and to, in some cases, automatically take those intervening actions. For example, when the market is saturated with non-difficult jobs, an abnormally large amount of unassigned, difficult jobs may develop. According to this example, to correct the inefficiency in the market, the market engine 132 intervenes by increasing the pay rate of difficult jobs or decreasing the pay rate of low difficulty jobs. In still another example, the market engine 132 intervenes to increase the pay rate of a job where the proximity of the current date and time and due date and time for the media file associated with the job transgresses a threshold.

In some embodiments, the market engine 132 is configured to use the preview functionality as an indicator of job difficulty and appropriate pay rate. For instance, in one example, the market engine 132 detects that the number of editors who have previewed a job and not claimed it has exceeded a threshold. Alternatively, in another example, the market engine 132 detects that the total preview duration of an unclaimed job has transgressed a threshold. These phenomena may indicate that the job is more difficult than is reflected by the current pay rate. The market engine 132 may then intervene to increase the pay rate to improve the chance that the job will be claimed or to split the media file into segments.

Additionally, in some embodiments, the market engine 132 monitors the status of, and information associated with, all jobs available on the market. This information includes difficulty, pay rate, due date and time, domain and summary information such as the number of editors with permission to edit a draft transcription, the amount of time a job has been on the market, the number of previews of the media file associated with a job, and other data concerning the market status of the job and its associated media file. In some embodiments, the market engine 132 is configured to use this information to ensure that problem jobs are accepted. For example, the market engine 132 may increase the pay rate, may enable a larger number of editors to access to the file, or may cut the file into shorter segments—thus producing several less difficult editing jobs for the same media file.

In other embodiments, the market engine 132 is configured to, under certain conditions, hide some of the low difficulty jobs in order to create a more competitive environment or to induce editors to work on difficult jobs. Additionally, in some embodiments, the market engine 132 is configured to encourage the editors to accept less desirable jobs by bundling jobs together with more desirable jobs. For example, the market engine 132 may group a selection of jobs with variable difficulty together so that a single editor would need to claim all of these jobs, instead of claiming only low difficulty jobs. Other characteristics that may determine the desirability of a job, and which may be used to determine the bundling, include customer, project, domain (e.g. interesting content), and historical time waiting on the market for the customer/project.

In some embodiments, the market engine 132 is configured to analyze the overall status of the market prior to modifying job characteristics. For instance, in one example, the market engine 132 monitors the amount of work available in the market, and if the amount transgresses a threshold, increases the pay rate for jobs that are within a threshold value of their due dates and times. In other embodiments, the market engine 132 is configured to analyze the dynamics of the overall market to determine intervening actions to perform. In one example, the market engine 132 measures the rate at which jobs are being accepted and measures the number of jobs or duration of the jobs, and estimates the time at which only the least popular jobs will remain in the market. If the market engine 132 determines that this time is sufficiently ahead of the due date and time for these jobs, then the market engine 132 may wait before increasing the pay rate.

In other embodiments, the market engine 132 is configured to set meta rules to affect the behavior of the market. Meta rules globally modify the behavior of the market by affecting how all or some of the available jobs will appear on the market. For instance, the market engine 132 may set a meta rule that prevents some percentage of the jobs from being available to any editors for a certain time period. The market engine 132 may use this rule during periods when there is a surplus of work, and therefore help to smooth out the flow of files through the system. Or, the market engine 132 may set a meta rule to make files available only to relatively inexperienced editors for a certain time period. The market engine 132 may use this rule where many relatively easy jobs are being processed by the market, so that the market presents a good opportunity to give less experienced editors more work in learning how to efficiently operate the editing platform. Or, the market engine 132 may set a meta rule that automatically send some percentage of jobs to multiple editors for cross-validation. Various embodiments may implement a variety of meta rules, and embodiments are not limited to a particular meta rule or set of meta rules.

In other embodiments, the market engine 132 is configured to implement a rewards program to encourage editors to claim difficult jobs. In one embodiment, the market engine 132 issues rewards points to editors for completing files and bonus points for completing difficult files. In this embodiment, the editor interface 126 is configured to serve a rewards screen via the user interface rendered on the client computer 106. The rewards screen is configured to receive requests to redeem reward and bonus points for goods and services or access to low difficulty media files.

In some embodiments, the market engine 132 is configured to estimate the expected completion time of the editing job and further refine the market clearing processes discussed above. If the market engine 132 determines that the current progress is not sufficient to complete the file on time, the editor may be notified of this fact via the editor interface 126, and, should the condition persist, the market engine 132 is configured to make the job available to other editors (i.e. to put the jobs back on the market). In some circumstances, the market engine 132 may revoke the entire job from the original editor. In this case, the job is put back on the market as if no work had been done. In other cases, the market engine 132 may dynamically split the job at the point where the original editor has completed editing, creating one or more new jobs that are comprised of the remaining file content. The market engine 132 puts these one or more new jobs on the market, and the original editor is paid only for the completed work. In this situation, the market engine 132 may notify the synchronization engine 138 of the status and location of any completed transcription segments. This functionality enables time efficient delivery to the customer of transcription products based on media (e.g., clips or clip reels) derived from the completed segments, as described further with reference to the synchronization engine 138 and the processes it executes. In other examples, the market engine 132 does not notify the synchronization engine 138 of completed transcription segments. In these examples, the synchronization engine 138 periodically scans the market data storage 134 and the media file storage 136 to determine whether one or more completed segments are available for processing.

In some embodiments, the market engine 132 is configured to process a delivery request or partial delivery request received from another component, such as the customer interface 124. In response to receiving a partial delivery request targeting a media file being processed in a job, the market engine 132 dynamically splits the job at the point where the original editor has completed editing and creates one or more new jobs that are comprised of the remaining file content. The market engine 132 puts these one or more new jobs on the market, and the original editor is paid only for the completed work. Further, in these embodiments, the market engine 132 notifies the synchronization engine 138 of the status and location of completed segments stored as a result of the job split. It is appreciate that the splitting functionality described herein may apply to any jobs being processed by the transcription system 100, such as QA jobs. In other examples, the market engine 132 does not notify the synchronization engine 138 of completed transcription segments. In these examples, the synchronization engine 138 periodically scans the market data storage 134 and the media file storage 136 to determine whether one or more completed segments are available for processing.

In another embodiment, in response to receiving a partial delivery request targeting a media file being processed in a job, the market engine 132 stores one or more segments of the transcription up to the point where the editor has completed editing without interrupting the job. In this embodiment, the market engine 132 notifies the synchronization engine 138 of the status and location of completed segments. In other examples, the market engine 132 does not notify the synchronization engine 138 of completed transcription segments. In these examples, the synchronization engine 138 periodically scans the market data storage 134 and the media file storage 136 to determine whether one or more completed segments are available for processing.

In other embodiments, the market engine 132 is configured to perform a variety of processes after receiving an indication that a job has been completed. For example, if a newly completed draft transcription information was split into segments, then the market engine 132 concatenates completed segments together into a completed transcript. In another example, the market engine 132 notifies the synchronization engine 138 of the location and status of the completed transcript. In other examples, the market engine 132 does not notify the synchronization engine 138 of the completed transcript. In these examples, the synchronization engine 138 periodically scans the market data storage 134 and the media file storage 136 to determine whether one or more completed transcripts are available for processing.

In another example, the market engine 132 is configured to compare a completed synchronized transcript with the draft transcription produced by the ASR device 122. In this example, the market engine 132 uses the number of corrections performed on the transcript to compute a standard distance metric, such as the Levenshtein distance. The market engine 132 stores this measurement in the market data storage 134 for later use in determining an objective difficulty for the editing job.

In various embodiments, the market engine 132 is configured to use the objective difficulty in a variety of processes. For example, in some embodiments, the market engine 132 uses the objective difficulty for a set of jobs to adjust the historical times-real-time statistic for an editor to determine the actual price that the customer pays for the transcription service, or as input to the automated difficulty-determination process discussed herein.

In other embodiments, the market engine 132 is configured to, prior to making the completed transcript available to the customer, create and post a new job to validate the completed transcription or the completed segments of a transcription. For example, in one embodiment, the market engine 132 creates and posts a QA job on the same market as the editing jobs. This QA job may target completed transcriptions or a completed segment of a transcription. A subset of editors may be qualified for the QA role, and the profiles of this subset may include a QA attribute. These editors would then be permitted to view, preview, and claim the QA jobs in the market via the editor interface 126. However, in some examples, the editor of the original transcript would not have permission to QA their own job, even if the editor in general is qualified to perform in a QA role. The profiles of some editors may include a QA attribute, but lack an editor attribute. These editors would only be permitted to view, preview, and claim QA jobs.

As the QA jobs normally require much less work than the original editing job, in some embodiments, the market engine 132 is configured to set the pay rate for the QA jobs at a lower level. However, in other embodiments, the market engine 132 is configured to monitor and adjust the pay rate for the QA jobs as for the editing jobs, with similar factors determining the pay rate, including file difficulty, the ASR_cost, the proximity of the due date and time, and the media file duration. Additionally, in some embodiments, the market engine 132 is configured to use QA-specific factors to determine the pay rate for QA jobs. For example, in one embodiment, the market engine 132 adjusts the pay rate based on the number of flags in the edited transcript, the historical proficiency of the original editor, the times-real-time it took to produce the completed transcription, and the ASR distance metric for the media file. Flags are set during the editing process and indicate problem content within the edited transcript. For example, flags may indicate content that is unclear or that requires additional research to ensure accurate spelling. In some embodiments, the flags are standardized to facilitate automatic processing by the components of the transcription system.

After this QA processing is complete, in some embodiments, the market engine 132 is configured to make the final synchronized transcription or its final synchronized segments available to the customer, who may then download the transcription or transcription segments for his or her own use via the customer interface 124. In other embodiments, after the QA processing is complete, the market engine 132 notifies the synchronization engine 138 of the status and location of the final synchronized transcription or its final synchronized segments. In other examples, the market engine 132 does not notify the synchronization engine 138 of final transcription information availability. In these examples, the synchronization engine 138 periodically scans the market data storage 134 and the media file storage 136 to determine whether final transcription information is available for processing. The final transcription or its finalized segments are also maintained in the media file storage 136 for reference and further processing, as discussed herein.

In some embodiments, to periodically measure editor proficiency, the market engine 132 is configured to allow a media file to be edited by multiple editors. For instance, in one example, the market engine 132 periodically creates several different editing jobs from the same media file, and these jobs are claimed and processed by multiple editors. The market engine 132 tracks the underlying media file and does not assign more than one of these jobs to the same editor. After several editors edit the same file, the market engine 132 executes a ROVER or similar process to determine intra-editor agreement, and thereby assign quality scores to individual editors, the quality score being proportional to the number of words in the editor's final transcript, which have high agreement among the other editors. In addition, the market engine 132 may use the ROVER process to produce the final transcript. In this case, the market engine 132 may assign different weights to different editors based on the editor characteristics (domain or customer expertise, historical transcription proficiency, etc).

In other embodiments, the market engine 132 is configured to build cost models that are used to determine predicted costs for editing draft transcriptions. In some of these embodiments, the market engine 132 is configured to generate cost models based on variety of information including historical productivity information, such as times-real-time statistics and ASR distance information. Further, in these embodiments, the cost models may be specific to particular editors, customers or projects. For instance, in one example, the market engine 132 builds cost models that accept a unique identifier for a media file, the ASR information (synchronized draft transcription, lattices, search statistics, acoustic characteristics) for the media file, and an indication of an editor, customer or project associated with the media file and that return a projected transcription cost that is conditioned on historical productivity associated with the editor, customer or project. Once these models are built, the market engine 132 stores them in the media file storage 136.

In some embodiments, customers may be given access to the transcripts for final editing via the customer interface 124. In these embodiments, the market engine 132 uses the customer edits as the gold-standard reference for computing editor accuracy. In other embodiments, the market engine 132 is configured to use times-real-time, stored in the market data storage at the time of job upload, as a factor in determining editor proficiency. Typically, the market engine 132 also adjusts the editing time (and thus the historical editing productivity for editors) by an objective difficulty, such as the ASR distance, because more difficult files will necessarily take longer to edit.

As described above, in some examples, customers are given access to edit transcription and caption information associated with synchronized derived content (e.g., clips or clip reels). FIG. 12 illustrates one example screen 1200 served by the customer interface 124 that supports this function. As shown in FIG. 12, the screen 1200 includes transcription information section 1202 and video clip captioning results section 1204. The transcription information section 1202 highlights text that is associated with synchronized derived content. The transcription information section 1202 further includes an edit word button, a delete word button, and an edit paragraph button that facilitate editing of the transcription information. In response to receiving input selecting any of these buttons, the screen 1200 provides one or more user interface elements or executes other processes that perform the function recited in the name of the button. The video clip captioning results section 1204 includes a graphical representation of the locations within the media file where portions of the clip may be found.

In some embodiments, the customer interface 124 is configured to provide a user interface to the customer 110 via the network 116 and the client computer 104. For instance, in one embodiment, the customer interface 124 is configured to serve a browser-based user interface to the customer 110 that is rendered by a web-browser running on the client computer 104. In this embodiment, the customer interface 124 exchanges customer and media file information with the customer 110 via this user interface. Media file information may include one or more media files, information associated with the one or more media files, or information descriptive of the attributes of the one or more media files. Specific examples of media file information include a media file to be transcribed, content derived from the media file (e.g., captions and caption placement information), a type of content included in a media file, a date and time a transcription of a media file is due, a domain of the subject matter presented in the content, a unique identifier of a media file, storage location of a media file, subtitles associated with a media file, annotations associated with a media file, semantic tagging associated with a media file, and advertising associated with a media file. Media file information is described further below with reference to FIG. 2. According to an example illustrated by FIG. 1, the customer interface 124 receives media file information from the user interface. This media file information includes a media file, information indicating a date and time that transcription of the media file is due, and a type of content included in the media file. Responsive to receipt of this media file information, the customer interface 124 stores the media file in the media file storage 136 and stores a unique identifier of the media file, the due date and time, and the content type in the market data storage 134.

According to an example illustrated by FIG. 1, the customer interface 124 receives media file information from the user interface. This media file information includes a media file and media file information indicating a domain of the subject matter of the content included in the media file or a project to be associated with the media file from which the domain may be derived. Responsive to receipt of this media file information, the customer interface 124 stores the media files in the media file storage 136 and stores a unique identifier of the media file and other media file information in the market data storage 134.

According to another example illustrated by FIG. 1, the customer interface 124 provides media file information to the user interface. This media file information includes unique identifiers of one or more media files previously received from the customer 110, the due dates and times associated with the received media files, and the project information associated with the received media files. In this example, the customer interface 124 receives modifications to the provided media file information made by the customer 110 via the user interface. Responsive to receiving the modifications, the customer interface 124 stores the modifications in the market data storage 134.

According to another example illustrated by FIG. 1, the customer interface 124 provides media file information to the user interface. This media file information includes one or more unique identifiers of one or more media files previously received from the customer 110 and other attributes of these files including, for example, the due dates and times, content types, prices, difficulties, and statuses or states of jobs associated with the previously received media files. As discussed above with reference to FIG. 8, examples of job states include New, ASR_In_Progress, Available, Assigned, Editing_In_Progress, and Complete. In some embodiments, the customer interface 124 serves media file information as one web page, while in other embodiments, the customer interface 124 serves this media file information as multiple web pages. It is to be appreciated that different due dates and times and content type may be associated with different prices to the customer. Customer prices may also be impacted by other factors that impact the underlying transcription cost, including how objectively difficult the media file transcription is to edit, as described above.

In another example, the customer interface 124 serves media file information that includes final transcription information to the user interface rendered by the client computer 104. This final transcription information includes a final (synchronized or non-synchronized) transcription of the content included in a media file. The synchronized transcription is comprised of a textual representation of the content of the media file, where each textual token has associated with it indicia of the location in the media file to which it applies. The textual tokens may include words, numerics, punctuation, speaker identification, formatting directives, non-verbal indicators (such as [BACKGROUND NOISE], [MUSIC], [LAUGHTER], [PAUSING]) and other markings that may be useful in describing the media file content. The empty string may also be used as a textual token, in which case the location indicia serves to keep the transcription synchronized with the media file content in the absence of useful textual information. In the case of the draft transcription from the ASR device, these empty-string tokens may be used if the ASR process was confident that some transcription-worthy event has occurred at that location, but is unsure of the particular identity of that event. In this case, having the location indicia associated with the event facilitates synchronized correction by the editor.

In other embodiments, the customer interface 124 is configured to receive a request to edit final transcription information from the user interface, and in response to the request, to provide an editing platform, such as the editing screen described below with reference to the editor interface 126, to the user interface. In this example, the editing platform enables customers to edit the final transcription information. Also, in this example, user interface includes elements that enable the customer 124 to initiate an upload of the edited final transcription information to the customer interface 124. The customer interface 124, in turn, receives the edited final transcription information, stores the final transcription information in the media file storage 136 and stores an association between the edited final transcription information and the media file with content that was transcribed in the market data storage 134.

Although the examples described above focus on a web-based implementation of the customer interface 124, embodiments are not limited to a web-based design. Other technologies, such as technologies employing a specialized, non-browser based client, may be used to implement the user interface without departing from the scope of the aspects and embodiments disclosed herein. For instance, according to one embodiment, the customer interface 124 is a simple, locally executed upload client that allows the customer to do nothing more than upload media files to the server via FTP or some other protocol. In other embodiments, the customer interface 124 is configured to perform a variety of processes in response to exchanging information via the user interface. For instance, in one embodiment, after receiving one or more media files via the user interface, the customer interface 124 provides the market engine 132 with an identifier of newly stored, unprocessed media files.

In some embodiments, the customer interface 124 is configured to provide a system interface to the client computer 104 via the network 116. For instance, in one embodiment, the customer interface 124 implements an HTTP API through which the client computer 104 exchanges transcription request information with the customer interface 124. The transcription request information may include request type information (e.g., an identifier indicating that the transcription request information includes an automatic synchronization request), project information (e.g., an identifier of a project), customer information (e.g. an identifier of a customer), media file information (e.g., an identifier of a media file or derived content), boolean values used to synchronize reference content with derived content, values of one or more thresholds used to synchronize reference content with derived content, identifiers of one or more requested transcription products, a delivery point identifier, and responses to any requests. In some embodiments, the delivery point identifier may include URI's, URL's, an FTP folder identifier (along with authentication credentials), or the like. In response to receiving the transcription request information, the customer interface 124 may store the transcription request information in the market data storage 134 in association with the identifier of the media file, project, or customer for which the requested transcription products are to be generated. In addition, responsive to receiving the transcription request information, the customer interface 124 may store the media file identified in the transcription request information in the media file storage 136. Transcription request information is described further below with reference to FIG. 2.

In some embodiments, the customer interface 124 is configured to perform a variety of processes in response to exchanging information via the system interface with the client computer 104. For instance, in one embodiment, after receiving transcription request information specifying a request for partial delivery of one or more transcription products, the customer interface 124 provides the request for delivery (or partial delivery) to the market engine 132.

In some embodiments, the administrator interface 130 is configured to provide a user interface to the administrator 114 via the network 120 and the client computer 108. For instance, in one embodiment, the administrator interface 130 is configured to serve a browser-based user interface to the administrator 114 that is rendered by a web-browser running on the client computer 108. In this embodiment, the administrator interface 130 exchanges market information with the administrator 114 via this user interface. Market information may include any information used to maintain the transcription job market and stored within the market data storage 134. Specific examples of market information include a media file information, job information, customer information, editor information, administrator information and transcription request information. Market information is described further below with reference to FIG. 2. Using the administrator interface 130, the administrator 114 acts as a transcription manager who regulates the transcription job market as a whole to promote its efficient allocation of resources.

In these embodiments, the administrator interface 130 is also configured to receive a request from the user interface to provide a preview of a media file, and in response to the request, serve a preview screen for the requested media file to the user interface. This preview screen provides the content of the media file and the draft transcription associated with the media file. More particular, in some embodiments, the preview screen is configured to provide the media file content, in the form of, for example, a streamed version of the original file, as well as the draft transcription information for the media file, which includes time-codes or frame-codes. This information enables the preview screen to display the draft transcription in synchronization with the media file content. A preview may consist of all or some of this information.

According to an example illustrated by FIG. 1, the administrator interface 130 provides media file information to the user interface. This media file information includes one or more unique identifiers of one or more media files previously received from the customer 110, the content types associated with the received media files and the difficulties associated with the received media files. In this example, responsive to receipt of an indication that the administrator 114 wishes to preview a media file, the administrator interface 130 provides a preview of the media file and the draft transcription information associated with the media file. Further, in this example, the administrator interface 130 receives modifications to the provided media file information made by the administrator 114 via the user interface. Responsive to receiving the modifications, the administrator interface 130 stores the modifications in the market data storage 134.

In other embodiments, the administrator interface 130 is also configured to receive a request from the user interface to provide an administrator view of all jobs available on the market, and in response to the request, serve an administrator screen to the user interface. This administrator view is configured to display the same information available to editors viewing the job market (difficulty, pay-rate, due date and time, domain, etc.), and also displays additional information to assist the administrator. For example, the administrator view may display the number of editors with permission to edit each available media file, the amount of time each job has been on the market, the number of previews of the media file, and other data concerning the market status of the media file. In this way, the administrator view displays information that enables administrators to ensure that the media file is accepted as an editing job.

The administrator interface 130 is also configured receive a request from the user interface to modify information displayed by administrator view, and in response to the request, store the modified information. Thus, the administrator view may increase the pay rate, may manually enable a larger number (or smaller number) of editors access to the file, or may cut the file into shorter segments—thus producing several editing jobs for the same media file. The administrator view may also bundle jobs together to ensure that all editors have access to a reasonable cross-section of work. For example, the administrator view may group a selection of jobs with variable difficulty together so that a single editor would need to accept all of these jobs, instead of just picking low difficulty jobs for themselves. The administrator view may also throttle the supply of low difficulty jobs in order to create a more competitive environment or to induce editors to work on difficult jobs. The administrator view may also record as accepted a claim offer that is higher than the pay rate for a job.

In other embodiments, the administrator interface 130 is also configured to receive a request from the user interface to provide a meta rules view, and in response to the request, serve a meta rules screen to the user interface. Meta rules globally modify the behavior of the market by affecting how all or some of the available jobs will appear on the market. In some embodiments, the administrator interface 130 is configured receive a request from the user interface to add to or modify meta rules displayed by meta rules view, and in response to the request, store the newly introduced meta rule information.

In other embodiments, the administrator interface 130 is also configured to receive a request from the user interface to provide a market view of jobs available on the market, and in response to the request, serve a market screen to the user interface. The market screen is configured to provide summarized information about jobs organized according to one or more job (or associated media file) attributes. For instance, one example of the market screen displays all of the jobs assigned to one or more editors. In another example, the market screen displays all jobs organized by due date and time in the form of a calendar. In yet another example, the market screen displays all jobs belonging to a particular customer.

Although the examples described above focus on a web-based implementation of the administrator interface 130, embodiments are not limited to a web-based design. Other technologies, such as technologies employing a specialized, non-browser based client, may be used without departing from the scope of the aspects and embodiments disclosed herein.

In some embodiments, the editor interface 126 is configured to provide a user interface to the editor 112 via the network 118 and the client computer 106. For instance, in one embodiment, the editor interface 126 is configured to serve a browser-based user interface to the editor 112 that is rendered by a web-browser running on the client computer 106. In this embodiment, the editor interface 126 exchanges media file information, editor information and job information with the editor 112 via this user interface. Editor information may include information associated with an editor profile or the history of an editor within the transcription job market. Job information may include information associated with transcription jobs that are available or that have been completed via the transcription job market. Specific examples of editor information include a unique identifier of the editor, domains of subject matter in which the editor is qualified to work, and identifiers of currently claimed jobs. Specific examples of job information include a unique identifier of the job, a deadline for the job, and a pay rate for the job. Media file information, editor information and job information are described further below with reference to FIG. 2.

In these embodiments, the editor interface 126 is configured to provide job information only for jobs that the editor 112 is permitted to work. In one example, the editor interface 126 determines that an editor is permitted to edit a draft transcription based on a complex of factors. If a media file associated with the draft transcription has a specific content type, then in some examples, the editor interface 126 will only provide job information associated with the media file to editors qualified to edit that specific content type. In other examples, the editor interface 126 may provide job information associated with more difficult files to more experienced editors. In still other examples, the editor interface 126 provides job information for jobs associated with specific customers to particular subset of editors. This approach may be advantageous, for example, if there are confidentiality concerns and only that subset of editors have signed non-disclosure agreements. Thus, examples of the editor interface 126 do not provide job information to the editor 112 for jobs claimed by another editor or for jobs that the editor 112 does not have permission to claim.

In other embodiments, the editor interface 126 is configured to receive a request from the user interface to provide a preview of a media file, and in response to the request, serve a preview screen for the requested media file to the user interface. This preview screen provides the content of the media file and the draft transcription information associated with the media file. Editors may be given access to the preview screen for a media file before they choose to accept the editing job at the given pay rate. The preview screen includes the media file content, in the form of, for example, a streamed version of the original media file, as well as the draft transcription information for the media file, which includes time-codes or frame-codes. This information enables the preview screen to display and draft transcription in synchronization with playback of the media file content. A preview may consist of all or some of this content. The editors may access the preview screen content and thereby assess for themselves the difficulty of the editing job, and then make a judgment as to whether they are willing to accept the job at the current pay rate. This enables editors to select content that they are interested in and to reveal their expertise or preferences for subject matter that would otherwise by unknown to administrators. In aggregate this will tend to improve transcription quality since the jobs will be better matched to editors than if randomly assigned.

According to an example illustrated by FIG. 1, the editor interface 126 provides job information to the user interface. This job information includes one or more unique identifiers of one or more jobs available for the editor 112, identifiers of the media files associated with the jobs, pay rates of the jobs, domain information, and durations of the content of the media file associated with the job. In this example, responsive to receipt of an indication that the editor 112 wishes to preview a media file, the editor interface 126 provides a preview of the media file and the draft transcription information associated with the media file. If the editor 112 wishes to claim the job, the editor 112 indicates this intent by interacting with the user interface and the user interface transmits a request to claim the job for the editor 112 to the editor interface 126. Next, in this example, the editor interface 126 receives the request to claim an available job from the user interface, and responsive to receiving this request, the editor interface 126 records the job as claimed in the market data storage 134.

In other embodiments, the editor interface 126 is configured to receive a request from the user interface to edit a draft transcription, and in response to the request, serve an editing screen to the user interface. The editing screen is configured to provide a variety of tools for editing and correcting the draft transcription. For instance, the editing screen provides access to the original file (or a converted version of the original file) along with the draft transcription information by referencing information contained in both the market data storage 134 and the media file storage 136.

In one embodiment, once an editor begins working on a job, the editing screen provides the complete media file content and synchronized draft transcription information for editing using client-computer-based editing software. The editor interface 126 also transitions the job into a working state by recording the working state for the job in the market data storage 134.

The editing process consists of playing the media file content, and following along with the draft transcription, modifying the draft transcription information as necessary to ensure that the saved draft transcription reflects the content of the media file. According to some embodiments, as the editor modifies the draft transcription information, the editing screen communicates with the editor interface 126 to indicate progress through the editing job. The editing screen tracks the time point into the file that the editor is playing, as well as the parts of the draft transcription information that has been modified in order to estimate progress. The progress is communicated back to the editor interface 126, and the editor interface 126 then stores this progress in the market data storage 134 in association with the editing job. In the course of editing a job, the editor may come across words or phrases that are difficult to understand. The editing screen allows editors to flag these regions, so that they may be reviewed and possibly corrected by an administrator. A flag may indicate complete unintelligibility or may include a guess as to the correct word, but with an indicator that it is a guess. For each job, the prevalence of corrected flags in the edited transcript is stored in the market data storage 134, and the market engine 132 may use stored flags as an indicator of editor proficiency to aid with future job assignment. In some embodiments, the editing screen allows editors to store auxiliary deliverables such as search keywords, descriptive summarization, and other metadata derived from the transcription information during editing jobs and QA jobs.

In other embodiments, the editor interface 126 is configured to receive a request from the user interface to save an edited draft transcription, and in response to the request, save the edited draft transcription to the media file storage 136 and update progress information for the job in the market data storage 134. In some embodiments, saving the progress information triggers estimation of a new completion date and time, which is then evaluated relative to the due date and time as discussed with reference to FIG. 6 below.

According to an example illustrated by FIG. 1, the editor interface 126 provides job information to the user interface. This job information includes one or more unique identifiers of one or more jobs available for the editor 112, identifiers of the media files associated with the jobs, pay rates of the jobs, durations of the content of the media file associated with the job and progress the editor 112 has made editing the draft transcription associated with the job. In this example, responsive to receipt of an indication that the editor 112 wishes to edit the draft transcription, the editor interface 126 serves an editing screen to the user interface.

In some embodiments, the editing screen is configured to receive an indication that the editor has completed a job. In these embodiments, the editing screen is also configured to, in response to receiving the indication, store the edited draft transcription information as final transcription information in the media file storage 136 and update the market data storage 134 to include an association between the media file and the final transcription information.

The examples described above focus on a web-based implementation of the editor interface 126. However, embodiments are not limited to a web-based design. Other technologies, such as technologies employing a specialized, non-browser based client, may be used without departing from the scope of the aspects and embodiments disclosed herein.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the transcription system 100 or unauthorized access to the transcription system 100.

Figure 2:
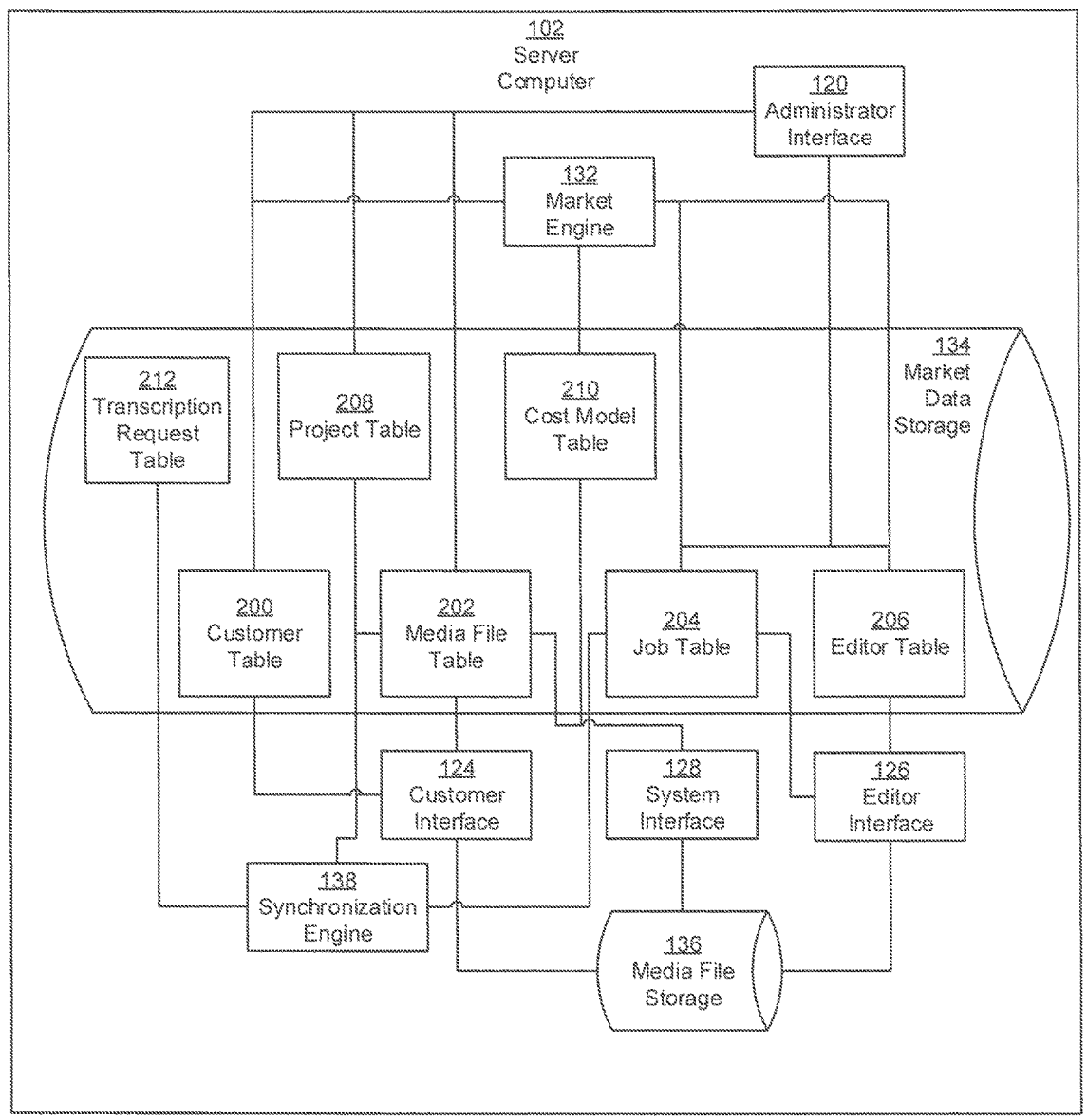
FIG. 2 is a schematic diagram of the server computer shown in FIG. 1.

FIG. 2 illustrates the server computer 102 of FIG. 1 in greater detail. As shown in FIG. 2, the server computer 102 includes the market engine 132, the market data storage 134, the customer interface 124, the system interface 128, the editor interface 126, the media file storage 136 and the synchronization engine 138. In the embodiment illustrated in FIG. 2, the market data storage 134 includes a customer table 200, a media file table 202, a job table 204, an editor table 206, a project table 208 and a cost model table 210.

In the embodiment of FIG. 2, the customer table 200 stores information descriptive of the customers who employ the transcription job market to have their media files transcribed. In at least one embodiment, each row of the customer table 200 stores information for a customer and includes an customer_id field, and a customer name field. The customer_id field stores an identifier of the customer that is unique within the transcription job market. The customer name field stores information that represents the customer's name within the transcription job market. The customer_id is used as a key by a variety of functions disclosed herein to identify information belonging to a particular customer.

The media file table 202 stores information descriptive of the media files (e.g., reference files and derived content files) that have been uploaded to the transcription job market for transcription. In at least one embodiment, each row of the media file table 202 stores information for one media file and includes the following fields: media_file_id, customer_id, state, duration, due_date_and_time, difficulty, domain, ASR_ cost, proposed_pay_rate, ASR_transcript_location, edited_transcript_location, QA_transcript_location, advertisement, transcript_product1, transcript_product2, etc. . . . . The media_file_id field stores a unique identifier of the media. The customer_id field stores a unique identifier of the customer who provided the media file. The state field stores information that represents the state of the media file. The duration field stores information that represents the duration of the content of the media file. The due_date_and_time field stores information that represents the date and time by which the customer requires a transcription be complete. The difficulty field stores information that represents an assessed difficulty of completing a transcription of the media file. The domain field stores information that identifies a subject matter domain to which the media file belongs. The ASR_cost field stores information that represents a predicted cost of transcribing the media file as assessed using draft transcription information. The proposed_pay_rate field stores information that represents a pay rate proposed using draft transcription information. The ASR_transcript_location field stores an identifier of a location of draft transcript information associated with the media file. The edited_transcript_location field stores an identifier of a location of edited draft transcript information associated with the media file. The QA_transcript_location field stores an identifier of a location of QA transcription information associated with the media file. The advertisement field stores one or more identifiers of one or more locations of one or more advertisements associated with the media file. The transcript_product1, transcript_product2, etc. . . . store identifiers of locations of other transcription products or other derived content associated with the media file (e.g., products that may be uploaded via the customer interface 124 or generated by the transcription system 100). The media_file_id is used as a key by a variety of functions disclosed herein to identify information associated with a particular media file.

The job table 204 stores information descriptive of the jobs to be completed within the transcription job market. In at least one embodiment, each row of the job table 204 stores information for one job and includes the following fields: job_id, media_file_id, deadline, state, job_type, pay_rate, editor_id, progress, flags, XRT, corrections, hide, ASR_distance. The job_id field stores an identifier of the job that is unique within the transcription job market. The media_file_id field stores the unique identifier of the media file to be transcribed by an editor working the job. The deadline field stores information that represents the date and time by which the job must be complete. The state field store the current state (or status) of the job. Examples values for the state field include New, ASR_In_Progress, Available, Assigned, Editing_In_Progress, and Complete. The job_type field stores information that represents a type of work that must be performed to complete the job, for example editing, QA, etc. The pay_rate field stores information that represents a pay rate for completing the job. The editor_id field stores the unique identifier of the editor who has claimed this job. The progress field stores information that represents an amount of work completed for the job. The flags field stores information that represents the number and type of flags assigned to the job during editing, as described above. The XRT field stores information that represents the times-real-time statistic applicable to the job. The corrections field stores information that represents corrections made to the draft transcription as part of the job. The hide field stores information that determines whether components, such as the market engine 132 and the editor interface 126, should filter out the job from job views. The ASR_distance field stores information that represents the number of changes from the draft transcription made as part of the job. The job_id is used as a key by a variety of functions disclosed herein to identify information associated with a particular job.

The editors table 206 stores information descriptive of the editors who prepare transcriptions within the transcription job market. In at least one embodiment, each row of the editors table 206 stores information for one editor and includes the following fields: editor_id, roles, reward_points, domains, and special_capabilities. The editor_id field stores an identifier of the editor that is unique within the transcription job market. The roles field stores information representative of roles that the editor is able to assume with the transcription job market, for example, editor, QA, etc. Examples of these roles include editor and QA editor. The reward_points field stores information that represent the number of reward points accumulated by the editor. The domains field stores information that represents subject matter domains of media files that the editor has permission to edit. The special_capabilities field stores information that represents specialized skills that the editor possesses. The editor_id is used as a key by a variety of functions disclosed herein to identify information belonging to a particular editor.

In the embodiment of FIG. 2, the project table 208 stores information descriptive of projects that the transcription job market is being utilized to complete. In at least one embodiment, each row of the project table 208 stores information for a project and includes an project_id field, a project_name field, a customer_id field, and a domain field. The project_id field stores information that identifies a group of media files that belong to a project. The project_name field stores information that represents the project's name within the transcription job market. The customer_id field indicates the customer to whom the project belongs. The domain field stores information that identifies a subject matter domain of media files included in the project. The project_id is used as a key by a variety of functions disclosed herein to identify information grouped into a particular project.

In the embodiment of FIG. 2, the cost model table 210 stores information descriptive of one or more cost models used to predict the cost of editing the content included media files. In at least one embodiment, each row of the cost model table 210 stores information representative of a cost model and includes an editor_id field, a customer_id field, a project_id field and a Cost_Model_Location field. The editor_id field stores the unique identifier of an editor to whom the cost model applies. The customer_id field stores the unique identifier of a customer to whom the cost model applies. The project_id field stores the unique identifier of a project to which the cost model applies. The Cost_Model_Location field stores information identifying a location of the cost model. The editor_id, customer_id or project_id, any of which may be null or the wildcard indicator, may be used as a key by a variety of functions disclosed herein to identify a location of a cost model applicable to any of these entities.

The transcription request table 212 stores information descriptive of requests for delivery of transcription products. In at least one embodiment, each row of the transcription request table 212 stores information for one transcription request and includes the following fields: media_file_id, project_id, customer_id, delivery_point, transcription_product, and quality_thresholds. The media_file_id field stores a unique identifier of a media file that is the basis for the requested transcription products. The customer_id field stores a unique identifier of the customer who provided the transcription request. The delivery_point field stores an identifier of a location to which the requested transcription products may be transmitted. The transcription_product field stores identifiers of the requested transcription products, which include derived content such as transcriptions, captions, caption positioning information, and the like. The quality_thresholds field stores values of one or more quality thresholds associated with one or more potential delivery types. The delivery types may be defined by points in time, transcription status, or derived content status.

Various embodiments implement the components illustrated in FIG. 2 using a variety of specialized functions. For instance, according to some embodiments, the customer interface 124 uses a File_Upload function and a File_Update function. The File_Upload function uploads a file stored on a customer's computer to the server computer 102 and accepts parameters including customer_id, project_id, filename, and optionally, domain. The customer_id parameter identifies the customer's unique customer_id. The project_id identifies the project to which the media file belongs. The filename parameter specifies the name of the media file or derived content file to be uploaded by the customer interface 124. The domain parameter specifies the subject matter domain to which the media file belongs. In at least one embodiment, if the domain parameter is not specified, the market engine 132 determines the value of the domain parameter from the value of the domain field of a record stored within the project table 208 that has a project_id field that is equal to the project_id parameter.

In other embodiments, the File_Update function updates an attribute of a media file record and accepts parameters including media_file_id, attribute, and value. The media_file_id parameter identifies the media file record with attributes that will be modified as a result of execution of the File_Update function. The attribute parameter identifies an attribute to be modified. In at least one embodiment, this attribute may be the domain, difficulty or state of the media file, as stored in the media file table 202. The value parameter specifies the value to which the attribute is to be set as a result of executing the File_Update function.

In other embodiments, the system interface 128 uses a File_Send_to_ASR function and a File_Create_Draft function. The File_Send_to_ASR function provides a media file to the ASR device 122 and causes the ASR device 122 to perform automatic speech recognition on the content included in the media file. The File_Send_to_ASR function accepts parameters including media_file_id. The media_file_id parameter identifies the media file to be processed by the ASR device 122.

In other embodiments, the File_Create_Draft function creates draft transcription information for a media file and accepts parameters including media_file_id and ASR_output. The media_file_id parameter identifies the media file for which the draft transcription information will be created by execution of the File_Create_Draft function. The ASR_output parameter specifies the location of the ASR output generated by the ASR device 122 during its processing of the media file.

In other embodiments, the market engine 132 uses the following functions: File_Assess_Difficulty, File_Propose_Pay_Rate, File_Compute_Actual_Difficulty, Job_Create, Job_Split, Job_Adjust_Parameter and Job_Revoke. The File_Assess_Difficulty function determines an estimated difficulty to transcribe the content included in a media file and accepts parameters including a media_file_id. The media_file_id parameter identifies the media file including the content for which difficulty is being accessed.

In other embodiments, the File_Propose_Pay_Rate function determines an initial pay rate for transcribing the content included in a media file and accepts parameters including media_file_id and draft_transcription_information. The media_file_id parameter identifies the media file for which the proposed_pay rate that will be determined as a result of execution of the File_Propose_Pay_Rate function. The draft_transcription_information parameter specifies the location of the draft transcription information associated with the media file. The File_Propose_Pay_Rate function determines the initial pay rate using the information included in the draft transcription information.

In other embodiments, the File_Compute_Actual_Difficulty function determines an actual difficulty of transcribing the content included in a media file and accepts parameters including media_file_id (from which it determines the location of the draft_transcription_information and final_transcription_information from the media file table 202. The media_file_id parameter identifies the media file for which the actual difficulty will be determined as a result of execution of the File_Compute_Actual_Difficulty function. The File_Compute_Actual_Difficulty function determines the actual difficulty by comparing the content of the draft transcription included in the draft transcription information to the content of the final transcription included in the final transcription information. In one embodiment, File_Compute_Actual_Difficulty function uses the number of corrections performed on the transcription to compute a standard distance metric, such as the Levenshtein distance. The File_Compute_Actual_Difficulty function stores this measurement in the ASR_distance field of the job table 204.

In other embodiments, the Job_Create function creates a job record and stores the job record in the job table 204. The Job_Create function and accepts parameters including media_file_id, job_type, pay_rate and, optionally, deadline. The media_file_id parameter identifies the media file for which the job is being created. The job_type parameter specifies the type of editing work to be performed by an editor claiming the job. The pay_rate parameter specifies the amount of pay an editor completing the job will earn. The deadline parameter specifies the due date and time for completing the job.

In other embodiments, the Job_Split function segments a job into multiple jobs and accepts parameters including job_id and a list of timestamps. The job_id parameter identifies the job to be segmented into multiple jobs. The list of timestamps indicates the location in the media file at which to segment the media file to create new jobs.

In other embodiments, the Job_Adjust_Attribute function modifies the value of an attribute stored in a job record and accepts parameters including job_id, attribute and value. The job_id parameter identifies the job record with an attribute to be modified. The attribute parameter identifies an attribute to be modified. In at least one embodiment, this attribute may be the pay_rate, deadline, XRT, or ASR_distance of the job record, as stored in the job table 204. The value parameter specifies the value to which the attribute is to be set as a result of executing the Job_Adjust_Attribute function.

In other embodiments, the Job_Revoke function removes a job from an editor and makes the job available for other editors to claim according to the current market rules. The Job_Revoke function accepts parameters including job_id. The job_id parameter identifies the job to be revoked.

In other embodiments, the synchronization engine 138 uses the Derive_Product function and the Deliver_Product function. The Derive_Product function synchronizes derived content with reference content and derives one or more transcription products from the synchronized derived content. The Derive_Product function accepts parameters including transcription_product, transcription information, and derived content. The transcription_product parameter identifies a transcription product to be derived. For example, the transcription_product parameter may specify a clip with embedded captions, captions for the clip, a binary encoded caption format (e.g., such as SCC format) for the clip, and the like. The derived_content parameter specifies the location of derived content targeted for synchronization with the reference content pointed to be the transcription_information parameter. For example, the derived content parameter may specify a location of a clip or clip reel. The transcription_information parameter specifies the location of the transcription information targeted for synchronization with the derived content. For example, the transcription_information parameter may specify a location of draft (ASR) transcription information, edited transcription information, or QA transcription information. The transcription product may be stored in the media file storage 136 at a location specified by a product_id.

In other embodiments, the Deliver_Product function transmits one or more transcription products to a delivery point via the customer interface 124 and accepts parameters including a product_id, and delivery_point. The product_id parameter identifies the transcription product to be delivered to the location identified by the delivery_point parameter.

In other embodiments, the editor interface 126 uses the following functions: Job_Store_Output, Job_Update_Progress, Job_List_Available, Job_Preview, Job_Claim, and Job_Begin. The Job_Store_Output function stores the current version of the edited draft transcription and accepts parameters including a job_id. The job_id parameter identifies the job for which the current version of the edited draft transcription is being stored.

In other embodiments, the Job_Update_Progress function updates the progress attribute included in a job record and saves the current state of the transcription. The Job_Update_Progress function accepts parameters including job_id, transcription data and progress. The job_id parameter identifies the job record for which the progress attribute will be updated to the value specified by the progress parameter. The transcription data is saved to the location specified in the media file record associated with the job_id.

In other embodiments, the Job_List_Available function returns a list of jobs available to an editor and accepts parameters including editor_id, and optionally, job_type, domain, difficulty, deadline, and proposed_pay rate. The editor_id parameter identifies the editor for which the list of available jobs is being created. The job_type parameter specifies a job_type to which each job in the list of available jobs must belong. The domain parameter specifies a domain to which each job in the list of available jobs must belong. The difficulty parameter specifies a difficulty that the media file associated with the job in the list must have. The deadline parameter specifies a deadline that each job in the list of available jobs must have. The proposed_pay_rate parameter specifies a proposed_pay_rate that the media file associated with the job must have. It is to be appreciated that meta rules, may also impact the list of jobs returned by the Job_List_Available function.

In other embodiments, the Job_Preview function causes a preview screen to be provided to a user interface and accepts parameters including editor_id and job_id. The editor_id parameter identifies the editor for which the preview is being provided. The job_id parameter specifies the job that is being previewed.

In other embodiments, the Job_Claim function records a job as claimed and accepts parameters including editor_id and job_id. The editor_id parameter identifies the editor for which the job is being claimed. The job_id parameter specifies the job that is being claimed.

In other embodiments, the Job_Begin function causes an editing screen to be provided to a user interface and accepts parameters including job_id. The job_id parameter specifies the job associated with the draft transcription to be edited.

Embodiments of the transcription system 100 are not limited to the particular configuration illustrated in FIGS. 1 and 2. Various examples utilize a variety of hardware components, software components and combinations of hardware and software components configured to perform the processes and functions described herein. In some examples, the transcription system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
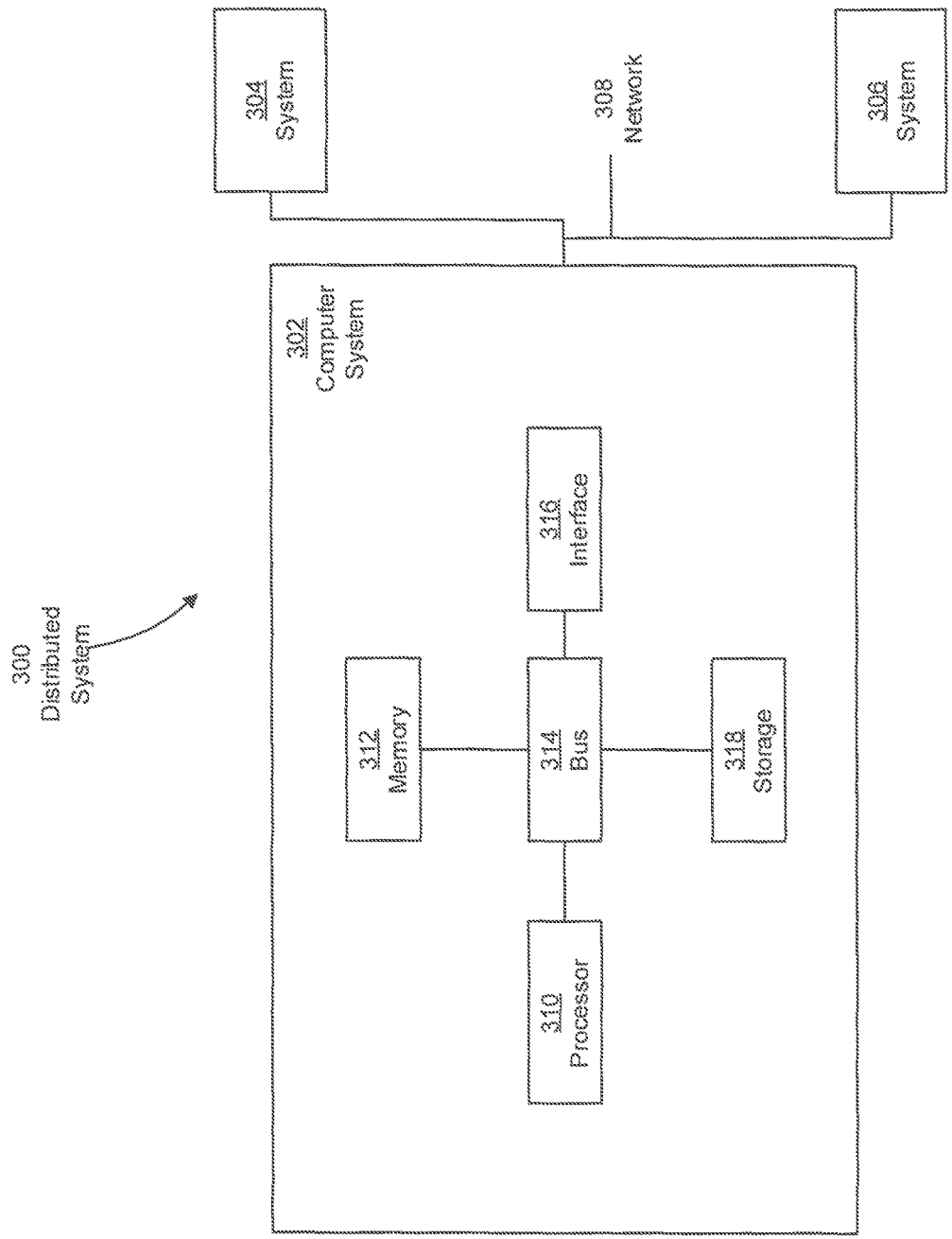
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Transcription System Processes

Figure 4:
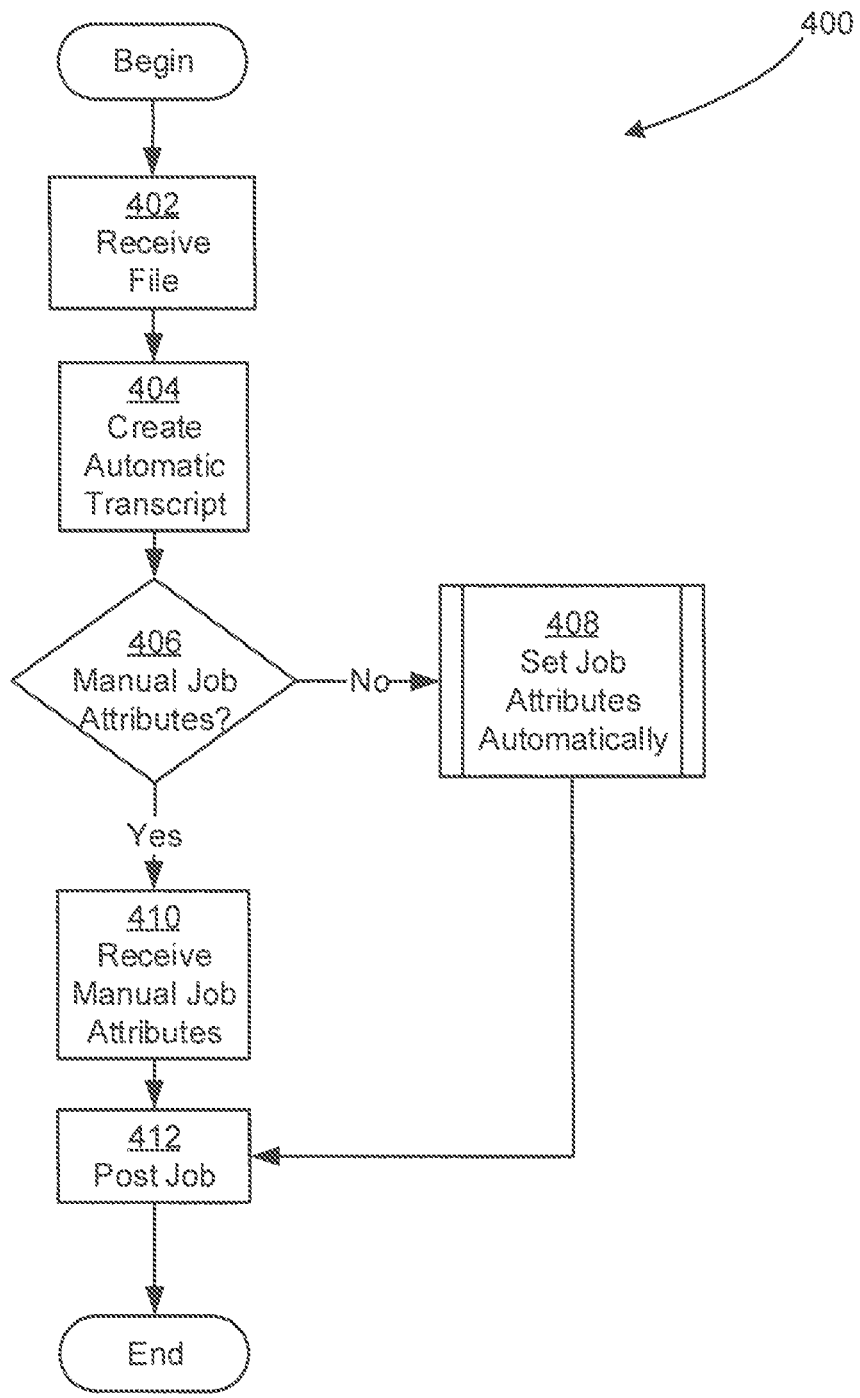
FIG. 4 is a flow diagram illustrating a process for creating a transcription job.

Some embodiments perform processes that add jobs to a transcription job market using a transcription system, such as the transcription system 100 described above. One example of such a process is illustrated in FIG. 4. According to this example, a process 400 includes acts of receiving a media file, creating an ASR transcription, receiving job attributes, setting job attributes automatically and posting a job.

In act 402, the transcription system receives a media file including content to be transcribed. Next, in act 404, the transcription system uses an ASR device to produce an automatic transcription and associated information. After the automatic transcription is created, the transcription system optionally delivers the automatic transcription to the customer and determines whether attributes for a job to be associated with the media file will be set manually in act 406. If so, the transcription system receives the manually entered job attributes in act 410. Otherwise, the transcription system executes a process that sets the job attributes automatically in act 408. This process is described further below with reference to FIG. 7. Once the job attributes have been set, the transcription system posts the job in act 412, and the process 400 ends.

Figure 5:
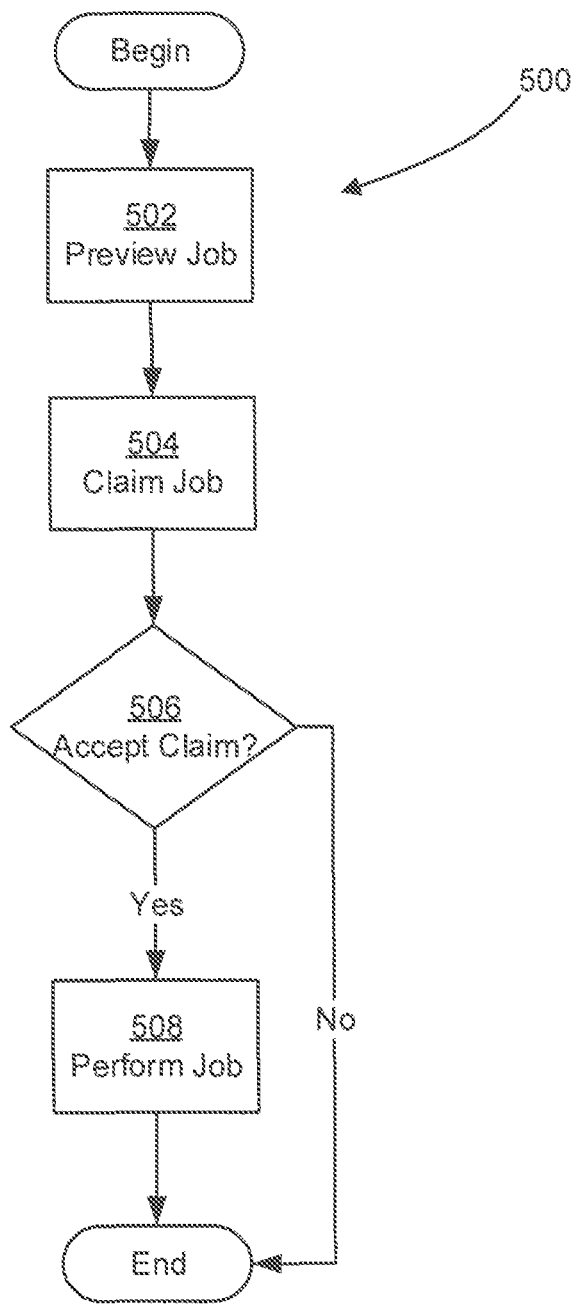
FIG. 5 is a flow diagram illustrating a process for editing a transcription job.

Other embodiments perform processes that allow and editor to perform a job listed on the transcription job market using a transcription system, such as the transcription system 100 described above. One example of such a process is illustrated in FIG. 5. According to this example, a process 500 includes acts of previewing a job, claiming a job and completing a job.

In act 502, the transcription system receives a request to provide a preview of a job. In response to this request, the transcription system provides a preview of the job. The preview includes a preview of the content included in the media file associated with the job and draft transcription information for an ASR generated transcription that is associated with the media file. The preview may also include job attributes such as pay rate, domain, duration, and difficulty.

Next, in act 504, the transcription system receives a request to claim the job. In response to this request, the transcription system determines whether to accept the claim using the processes disclosed herein. If the claim is not accepted, the process 500 ends. If the claim is accepted, the process 500 executes act 508.

In the act 508, the transcription system receives a request to perform the job. In response to this request, the transcription system provides a user interface and tools that enable an editor to perform work. While the editor is performing the work, the transcription system monitors progress and periodically saves work in process. Upon receipt of an indication that the editor has completed the job, the transcription system saves the completed job, and the process 500 ends.

Figure 6:
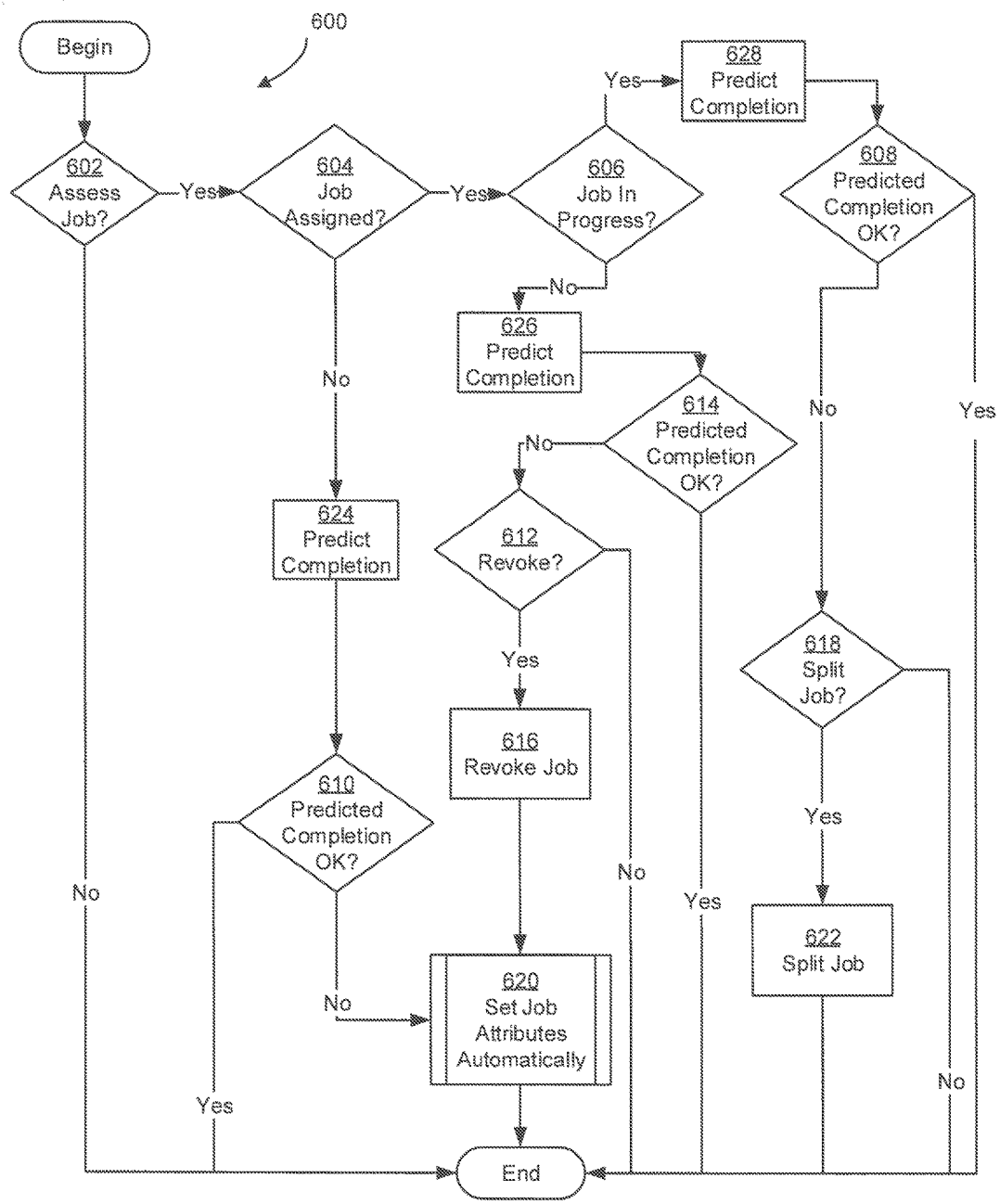
FIG. 6 is a flow diagram illustrating a process for calibrating a job.

Other embodiments perform processes that monitor jobs to ensure the jobs are completed according to schedule using a transcription system, such as the transcription system 100 described above. One example of such a process is illustrated in FIG. 6. According to this example, a process 600 includes several acts that are described further below.

In act 602, the transcription system determines whether a job should be assessed for attribute adjustment. The transcription system may make this determination based on a variety of factors including receipt of a request to assess the job from a component of the system or an entity external to the system (e.g., a request for immediate delivery of the job's output) or expiration of a predetermined period of time since the job was previously assessed, i.e., a wait time. If the job should not be assessed, the process 600 ends. Otherwise, the process 600 executes act 604.

In the act 604, the transcription system determines whether the job is assigned. If so, the transcription system executes act 624. Otherwise, the transcription system determines whether the job is in progress in act 606. If not, the transcription system executes act 626. Otherwise, the transcription system executes the act 628.

In the acts 624, 626 and 628, the transcription system predicts the completion date and time of the job using one or more of the following factors: the current date and time, the amount of progress already complete for the job; historical productivity of the editor (in general or, more specifically, when editing media files having a characteristic in common with the media file associated with the job); the number of jobs currently claimed by the editor; the number of jobs the editor has in progress; and the due dates and times of the jobs claimed by the editor.

In some embodiments, the following equation is used to predict the completion date and time of the job:

$$Tc = To + [(1-Pj)*Dj*Xe] + [K1*Fc*Dc*Xc] + [K2*Fp*Dp*Xp]$$

Where,

Tc is the predicted completion time of the job

To is the current time

Pj is the progress on the job, expressed as a decimal fraction

Xe is the times-real-time-statistic for the editor, either the general statistic or the conditional statistic as determined by the job characteristics Xc is the times-real-time-statistic for the editor, either the general statistic or the conditional statistic as determined by the claimed job characteristics, taken as a whole Xp is the times-real-time-statistic for the editor, either the general statistic or the conditional statistic as determined by the in-progress job characteristics, taken as a whole Dj is the duration of the job Dc is the duration of the claimed but not yet in-progress jobs Dp is the duration of the in-progress jobs Fc is the fraction of the total claimed job duration accounted for by jobs which have a due date and time earlier than that of the current job Fp is the fraction of the total in-progress jobs duration accounted for by jobs which have a due date and time earlier than the current job K1 and K2 are tunable constants In act 608, the transcription system determines whether the predicted completion date and time of the job is before the due date and time of the job. If so, the process 600 ends. Otherwise, the transcription system executes act 618.

In act 610, the transcription system determines whether the predicted completion date and time of the job is before the due date and time of the job. If so, the process 600 ends. Otherwise, the transcription system executes a process that sets the job attributes automatically in act 620. This process is described further below with reference to FIG. 7. Once the job attributes have been set, the process 600 ends.

In act 614, the transcription system determines whether the predicted completion date and time of the job is before the due date and time of the job. If so, the process 600 ends. Otherwise, the transcription system determines whether to revoke the job in act 612. If not, the process 600 ends. Otherwise, the transcription system revokes the job in act 616.

In act 618, the transcription system determines whether to split the job. If not, the process 600 ends. Otherwise, the transcription system splits the job in act 622, and the process 600 ends.

Figure 7:
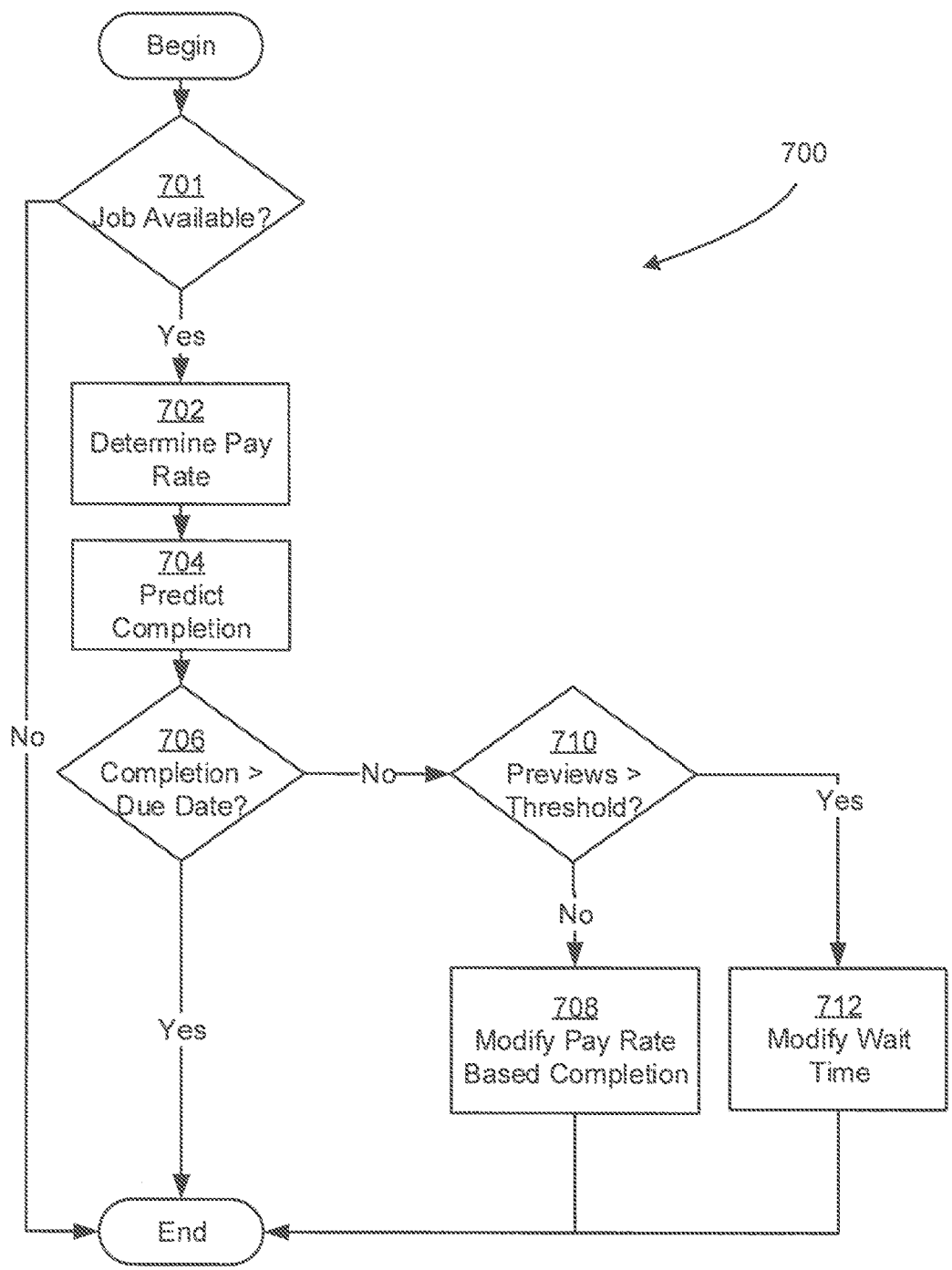
FIG. 7 is a flow diagram illustrating a process for determining transcription job attributes.

As discussed above with reference to FIGS. 4 and 6, some embodiments perform processes that set attributes of jobs using a transcription system, such as the transcription system 100 described above. One example of such a process is illustrated in FIG. 7. According to this example, a process 700 includes several acts that are described further below.

In act 701, the transcription system determines if the job is available. In not, the process 700 ends. Otherwise, the transcription system determines a pay rate for the job in act 702. The transcription system may make this determination based on any of a variety of factors including due date and time, difficulty, domain and ASR_cost.

In act 704, the transcription system predicts a completion date and time for the job for each editor. The transcription system may make this determination based on any of a variety of factors including difficulty, domain and historical XRT of previously completed, similar jobs.

In act 706, the transcription system determines whether the completion date and time is prior to the due date and time for the job. If so, the process 700 ends. Otherwise, the transcription system determines whether the number of previews provided for the job transgresses a threshold in act 710. If not, the transcription system executes act 708. Otherwise, the transcription system executes act 712.

In act 708, the transcription system modifies the pay rate based on the difference between the due date and time to the completion date and time, and the process 700 ends. For instance, the transcription system may set the modified pay rate equal to the unmodified pay rate plus a date and time increment amount multiplied by the difference between the due date and time and the completion date and time.

In act 712, the transcription system modifies the wait time for reassessment of the job, and the process 700 ends. For instance, the transcription system may set the modified wait time equal to the unmodified wait time plus an increment amount.

Figure 9:
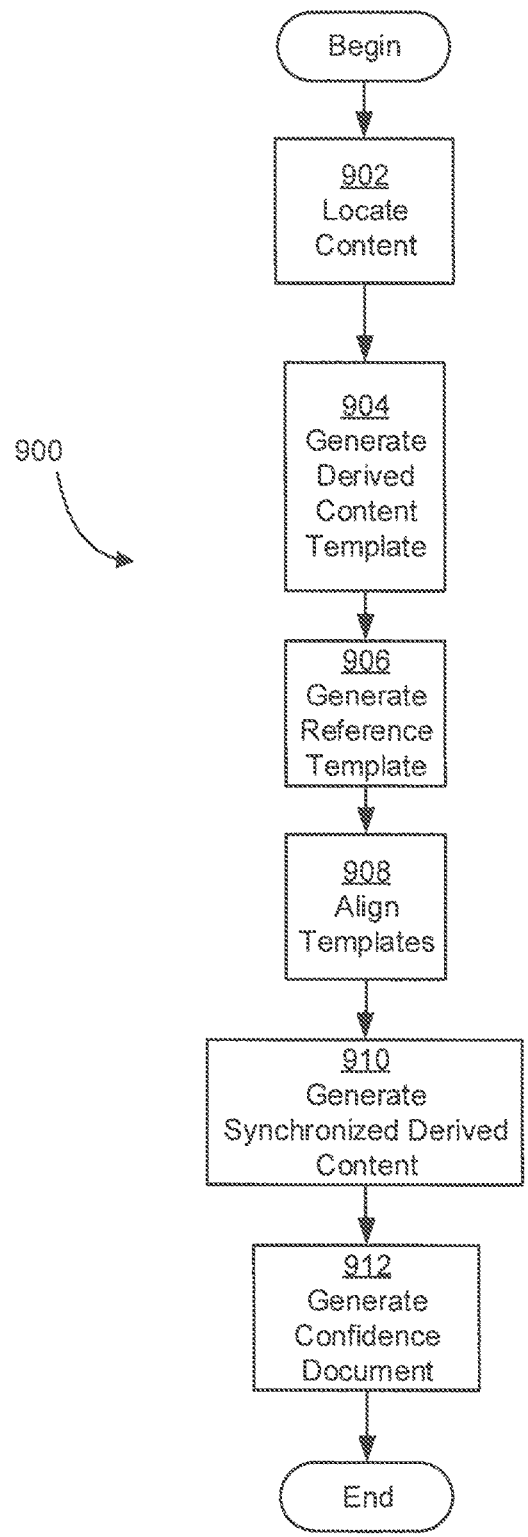
FIG. 9 is a flow diagram illustrating a process for synchronizing reference content with content derived from the reference content.

Other embodiments perform processes that synchronize reference content to content derived from the reference content using a transcription system, such as the transcription system 100 described above. One example of such a process is illustrated in FIG. 9. According to this example, a process 900 includes several acts described further below.

In act 902, a synchronization engine, such as the synchronization engine 138 described above with reference to FIG. 1, locates reference content and derived content. In one example, the located reference content is generated by the overall workflow for producing transcriptions implemented by the transcription system (e.g., the process 800 described above with reference to FIG. 8). According to this embodiment, media files are uploaded to the system (using, for example, 3Play Media's HTTP API) via a customer interface (e.g., the customer interface 124 described above with reference to FIG. 1), and increasingly accurate transcriptions of the audio portion of the media are produced by automated processing (e.g. transcoding, automatic speech recognition and natural language processing), human editing, and, potentially, depending on configuration, human quality assurance review. The completed synchronized transcriptions are stored in a market data storage (e.g., the market data 134 storage described above with reference to FIG. 1) in association with the original media file, for example, using a unique identifier such as a media_file_id as a key in the market data storage. Captions may be constructed according to the system described in the "Intelligent Captions" application. Also, or in isolation, the caption positions may be determined according to the system described in the "Automated Caption Positioning" application.

In some examples of the act 902, the synchronization engine receives transcription request information including an automatic synchronization request that identifies a media file that does not have extant synchronization information. In this example, the synchronization engine is configured to, in response to receiving the automatic synchronization request, transmit a request to a market engine component, such as the market engine component 132, to generate synchronization information in association with transcription information.

In another example, the reference content located and identified in the act 902 includes one or more media files, synchronized transcriptions, and caption files uploaded to ("imported into") the system via the customer interface, for instance using an API or FTP method. According to this example, the reference content is stored in the market data storage, as if the transcription and captions had been generated by the process 800. In this example, the automated and manual transcription steps are not executed, and the media file is stored in a completed state in the market data storage. In some examples, the customer interface converts the format of the reference content from a first format (e.g., SRT, VTT, SCC, DFXP) to a standard system format prior for performing additional processing. In some embodiments, this standard system format encodes, within a json file, timecodes, text, and, in some examples, positions of captions for each caption frame. Captions imported to the transcription system according to this example may have positioning information included. Alternatively, in response to a request to determine caption position information (e.g. by a parameter supplied to the API), the transcription system may determine caption position information according to the transcription system described in the "Automated Caption Positioning" application. Additionally, or in isolation, and in response to a request to do so (e.g. by a parameter supplied to the API), the transcription system may ignore caption frames uploaded with the remainder of the reference content and generate new caption frames. These new caption frames may be based on words and, optionally, timings in the uploaded transcription or captions and be generated in accordance with the "Intelligent Captions" application.

In another example, the reference content located and identified in the act 902 includes other synchronized data and metadata descriptive of the media file contents such as subtitles, annotations, semantic tagging, advertising, and the like that may be associated with the original media file. These data may be generated by normal operation of the transcription system (for example, as described in the "Metadata Media Associator" application), or may be received separately via the customer interface. In this example, these data are stored in the market data storage in association with the media file.

In one example, the derived content located and identified in the act 902 is a clip reel uploaded to the system using a method similar to the reference content. In this example, the upload process (e.g., an HTTP API invocation, FTP upload, or manual upload from a user interface) generates transcription request information. This transcription request information includes a request to automatically synchronize the clip reel with an existing media file and transcription. The existing transcription is indicated by an identifier of an existing media file. For example, where the clip reel is comprised of segments from an existing media file with an identifier of 275462, the API call may be:

POST https://api.3playmedia.com/files?service=video_clip_synchronization&media_file_id=275462

Other parameters may be provided in the API call, as discussed below. The transcription request information may be stored in the database using a unique request identifier as a key. The clip reel may be stored on a file server, and then a file pointer to the clip real and the media_file_id may be stored in the market data storage in association with the request identifier. It is appreciated that the transcription request information described above may be transmitted prior to completion of the reference content (e.g., a synchronized transcription). In this case, the transcription request information including the synchronization service request would be stored in the market data storage, but execution of act 906 would be delayed until the reference transcription is available.

In act 904, the synchronization engine generates a template for the derived content. In some examples, a derived content template includes information sufficient to align the derived content with a reference template generated from the one or more media files from which the derived content was derived. The derived content template is robust to minor changes in the derived content, such as audio and video filtering, added signals, or noise. In one example, the synchronization engine acquires the derived content template entirely from the audio portion of the derived content. The synchronization engine may construct the derived content template using any number of common features, such as: total energy envelope, band-limited energy envelope, discrete Fourier transform vector sequence, mel frequency cepstral coefficient sequence, modulation filter bank outputs, etc. Any number of these features may be used, with each sampled video frame represented by a concatenated feature vector. For instance, in one example, a single feature vector may be comprised of one coefficient representing the band-limited energy at a given video frame, concatenated with the Fourier transform coefficients at that video frame, etc. Also, in some examples, the synchronization engine executes a feature space reduction technique (e.g., linear discriminant analysis, principal components analysis, or vector quantization) to reduce the total computational requirements of the synchronization process, by reducing the size of the feature vectors.

The sampling period for the derived content template is typically 10 milliseconds (msec), but this varies between examples according to synchronization requirements. The synchronization engine may construct the derived content template by computing the feature vectors sequentially across the entire audio track corresponding to a video frame, clip, or clip reel, at the desired sampling frequency. The derived content template (e.g. sequence of feature vectors) may be stored in the market data storage in association with the original media file. Each sample (e.g. feature vector) may be associated with a time code from the derived content according to the sampling frequency.

In another example, the synchronization engine creates the derived content template from both the audio and video tracks of one or more media files. In this example, a feature vector may include both audio features and video features. Examples of video features include intensity histograms, edge locations, jpeg data reduction, or any other of numerous features that characterize the attributes of the video. In some examples, the synchronization engine constructs a sequence of feature vectors across the entire portion of derived content, with a typical sampling frequency of 10 msec and using windowing/averaging to merge video frames across the sampling window prior to feature extraction. The derived content template in this example may include the concatenated audio and video feature vectors. In some examples, the synchronization engine applies a dimensionality reduction transformation, with associated time codes (computed from the sampling frequency) across the media file and stores the derived content template within the market data storage in association with the video frame, clip, or clip reel.

In act 906, the synchronization engine generates a template for the reference content. In the act 906, the synchronization engine applies the same feature extraction described above with reference to the derived content to one or more media files serving as the reference content. The reference template may be stored in the market data store in association with the transcription request information specifying synchronization service request. In one example, the transcription information request may include an automatic synchronization service request to generate a reference template from a plurality of full length media files. This automatic synchronization request may specify the plurality of full length media files as, for example, a batch_id or project_id parameter provided via the API call. In response to receiving this automatic synchronization request, the synchronization engine generates a reference template from the plurality of full length media file specified in the API call. In this example, the reference template may be stored in association with the relevant (e.g. batch-level or project-level) media file grouping and with media_file_ids appended to the time-indexing to facilitate the transcription or caption extraction described in act 910 below.

In act 908, the synchronization engine aligns the derived content template with the reference template. A variety of alignment procedures may be executed within the act 908. In broad overview, these alignment procedures use similarity metrics (e.g., correlation coefficients, distance measures, etc.) to identify portions of the derived content template that match portions of the reference content and associate these matched portions into a map of alignment information. The alignment procedures disclosed below include a place-and-prune procedure, a partition-and-place procedure, and a seed-and-grow procedure. Each of these procedures is described in further detail below.

Place-and-Prune Procedure

When executing the place-and-prune procedure, the synchronization engine aligns the derived content template with the reference template by executing a process described by lines 1-117 of the Pseudo-Code Listing below. In the Pseudo-Code Listing, annotations begin with the "#" character. As illustrated in the Pseudo-Code Listing, the arguments to the ComputeDistance( ) function (invoked at lines 32, 58, and 88) are a clip template, a reference template, and an index into the reference template at which the distance computation starts (proceeding upward from that index). According to various embodiments, the comparison in ComputeDistance( ) may be done with any number of standard distance measures, such as the cosine distance, the Pearson correlation coefficient, the Mahalonibis distance, or the Euclidean distance. If the Pearson correlation coefficient were used, the ComputeDistance( ) function would subtract the return value from 1.0, so that the comparisons with this measure in the rest of the pseudo-code would operate correctly.

In one example, the index_where( ) method invocation at line 37 returns the first index (i.e. leftmost index) of the average_distance array where the value matches best_distance. In another example, this method may be modified to return the last index matching the best_distance value. In another example, the synchronization engine maintains multiple alignment arrays, each corresponding to a separate set of matches. Where multiple indices match the best_distance value (or are within a threshold parameter of this value), the synchronization engine selects the alignment array from the multiple alignment arrays that minimizes the total sub_clip distance across all sub_clips.

Continuing this example, the Prune_Increment at line 5 specifies a step value for pruning the left and right video frames from the derived content template. This value may be increased to speed up the process, at the cost of some precision in creating the alignment. The alignment_array constructed by the process described in the Pseudo-Code Listing encodes alignment information that describes the alignment between the derived content template and the reference template. That is, each element of the alignment_array corresponds to an index into the reference template.

In one example of the place-and-prune procedure, the API call supports a Boolean parameter indicating that the derived content (e.g., a clip reel), while not contiguous, is comprised of ordered clips, so that all indices in the alignment array will be monotonically increasing. In this example, the synchronization engine does not execute left pruning and assumes that all match regions start after a previous match region, except for the first match region. In other words, in this example, the place-and-prune procedure executed by the synchronization engine does not include lines 52 to 80 from the Pseudo-Code Listing, includes the following line above line 13 "alignment_end_index=0," and replaces line 25 with the following line "reference_start_index=MAX(alignment_end_index, 0)."

In another example of the place-and-prune procedure, the API call supports a Boolean option indicating that the derived content (e.g., a clip reel) is a contiguous subset of the reference media file. In this example, the synchronization engine does execute left or right pruning and, therefore, does not iterate for left and right subset clips. In other words, in this example, the process executed by the synchronization engine includes a 'GOTO FILL_IN_ALIGNMENTS' line after line 40.

In another example of the place-and-prune procedure, the synchronization engine compares the best_distance between at least a subset of the derived content template and the reference template to a value of a configurable maximum distance threshold to determine whether any valid match between the derived content template and the reference template exists. In this example, where the best distance exceeds the value of the maximum distance threshold, the synchronization engine determines that no valid match exists. Stated in view of the Pseudo-Code List, if the best_distance at line 109 were not less than or equal to this maximum threshold value, the acts in lines 110-115 would be skipped. In this way, the synchronization engine accounts for additional footage being added to a clip reel, for example an introductory announcement prior to a highlight reel. In this case, the new footage would not have any corresponding transcription or metadata extracted in the act 910, below. In some examples, the transcription or metadata for this new footage may be generated by the transcription system using the process 800.

Partition-and-Place Procedure

When executing the partition-and-place procedure, the synchronization engine divides the derived content template produced in the act 904 into template elements (referred to as sub_clip_templates in the Pseudo-Code Listing). The template elements may have constant length (for example 100 video frames, or 1 second in duration at a 10 msec video frame rate) or variable length (such as by cutting the audio track at silences or at across-frequency coherent onsets and offsets). In some examples, the length of the template elements is defined by the value of a configurable parameter. The value of this configurable parameter may be selected to balance execution speed with matching accuracy.

In some examples, each template element is associated with a match array that includes array elements which indicate a likelihood of a match for the entire template element for a given index into the reference template. In one example, the synchronization engine aligns template elements to the reference template by storing, in a distinct match array for each template element, the likelihoods of a match between that template element and the reference template at given location in the reference template.

In some examples, the synchronization engine determines actual match locations by combining these match likelihoods across template elements while favoring consecutive placement of template elements. In one example, the synchronization engine generates alignment information by shifting match arrays so that each sample index of any match array refers to a specific time offset into the reference template where a matching template element is likely to be located, stacking these match arrays into a matrix, and filtering across the matrix of stacked match arrays using a linear low-pass filter, median filter, or any other similar technique. This way, match arrays for consecutive template elements that have a high likelihood of matching consecutive portions of the reference template are included in a high filtered output, while spurious matches will tend to get attenuated by neighboring template element's match arrays. This process is demonstrated in lines 301-339 of the Pseudo-Code Listing below.

Seed-and-Grow Procedure

When executing the seed-and-grow procedure, the synchronization engine expands one or more template elements (referred to as "seeds" in this example) in response to finding a match for the template element in the reference template. In one example, the synchronization engine identifies a match for a given seed where the distance between a seed and a subset of the reference template is in a predetermined relationship with a configurable threshold value (e.g., distance between seed and subset of reference template<a configurable threshold value, correlation between seed and subset of reference template>a configurable threshold value, etc.). This example takes advantage of the fact that matches will tend to be longer than the initial template elements, and saves computing power by not exhaustively searching the reference template to match each template element. This process is demonstrated in lines 401-414 of the Pseudo-Code Listing below.

In this example, the find_matches( ) function (line 407) slides the derived content template over the reference template, as illustrated in lines 26-35 of the Pseudo-Code Listing. Then, for each matching template element, the expand_match_forwards_and_backwards( ) function gradually extends the boundaries of the template element forwards then backwards to form a match region. In one example, the expand_match_forwards_and_backwards( ) function extends the boundaries of the matching template element forwards by iteratively concatenating additional element templates after the location of the matching template element. In another example, the expand_match_forwards_and_backwards( ) function extends the boundaries of the matching template element backwards by iteratively concatenating additional element templates before to the location of the matching template element. The expand_match_forwards_and_backwards( ) function, extends the width of the match region and recomputes the score of each added template element, until the score begins to decline. At this point, the expand_match_forward_and_backwards( ) function can refine the exact boundary of the expanded match by repeating the processes above from the last added template element for each of the forwards and backwards directions, but now adding a segment of smaller length (e.g., 1 video frame, or more up to the number of video frames included in a template element). The find_matches( ) function and the expand_match_forwards_and_backwards( ) function may use one of the same comparison metrics as used in the ComputeDistance( ) function or find_match_likelihood( ) function. Using the Seed-and-Grow procedure, a 1-second segment that is part of a larger, 30-second clip, might be matched to its true location relative to the reference template, and this expansion would be responsible for determining that the next 29 seconds yielded a similar match to this 1-second seed, rather than beginning the search anew for each of the 29 1-second segments in this clip. At the end of these 30 second segments, the synchronization engine generates a new seed and repeats the process until the entire derived content template has been processed. If no match is found for a given template element, it is considered unmatched and the algorithm proceeds onto the next template element as a new seed.

At the end of this seed-and-grow procedure, many of the match regions might overlap because the synchronization engine expands backwards as well as forwards. Therefore, in at least one example, the synchronization engine refines the match regions to correct for some amount of false-positive matches in the expansion step. Thus, the select_best_arrangement( ) function detects any such overlaps and assigns them to a single match region. In one example, to accomplish this objective, the select_best_arrangement( ) function determine the best possible score of any given arrangement of match regions. In another example, the select_best_arrangement( ) function selects the best-scoring and longest match region first, delete any overlaps between the selected match region and other match regions, and repeats this process until no overlaps between match regions remain.

In another example, the ComputeDistance( ) function (lines 32, 58, 88), the detect_match_likelihood( ) function (line 317), the find_matches( ) function (line 407), and the expand_match_forwards_and_backwards( ) function (line 409) account for a non 1-1 correspondence between the derived content template indices and the reference template indices. In this example, the synchronization engine executes a dynamic time warping process to align the derived content template (or templates elements) with variable length portions of the reference template, while optimizing (minimizing) a distance metric such as the Levenshtein distance (weighted by the feature vector distance, e.g. the Euclidean distance). In this example, the synchronization engine sets the total distance in the numerator of line 32 (and 58 and 88) to this distance metric and sets the normalizer in the denominator of line 32 (and 58 and 88) to the number of reference video frames represented in the numerator. The alignment reconstruction acts in lines 109-115 and 326-338, and the higher-level matching methods at lines 407 and 409 may be modified to account for this scale factor. In this way, the synchronization engine accounts for changes in speed between the reference and clip.

Elements of the alignment procedures described above may be combined to produce other procedures. For example, the prune-and-place procedure may be modified such that the sub_clip templates are initialized as in the partition-and-place procedure, line 303, with the Prune_Increment at line 5 being set to the length of each sub_clip, so that no pruning takes place. Alternatively, the ComputeDistance( ) function at lines 32, 58, and 88 in the prune-and-place procedure may be patterned after the detect_match_likelihood( ) function at line 317 of the partition-and-place procedure. In another example, the detect_match_likelihood( ) function may use a direct distance computation or any of the other distance metrics mentioned for the previous procedures, etc.

In the act 910, the synchronization engine generates synchronized derived content. This synchronized derived content may include any transcription product (e.g., transcriptions, captions, etc.). In one example, the synchronization engine constructs the synchronized derived content from the alignment information (e.g. an alignment array) generated in the act 908 and the transcription information for the media file that was the source of the reference template. In examples configured to execute the seed-and-grow procedure within the act 908, the synchronization engine generates synchronized derived data in the form of caption frames, using a procedure illustrated in lines 499-507 in the Pseudo-Code Listing.

In some examples, the find_caption_frames( ) function finds caption frames that are located within the time period defined by the begin and end time arguments. Further, in these examples, the find_partial_caption_frames( ) function finds caption frames that are partially included in the time period. In this example, the find caption_frames( ) function and the find_partial_caption_frames( ) function may execute the same or different search strategies for finding the corresponding reference caption_frame entries based on the begin and end milliseconds in the argument list. For example, these functions may return an array of any entries whose time span overlaps the begin and end time arguments. Alternatively, these functions may return only those entries that are completely within the time span. In another example, these functions may take linguistic features into account in determining which entries are returned. For example, the search in these functions may expand backward before the begin time argument to find the latest entry from the original caption_frames that begins a sentence. Similarly the search may expand forward after the end time to find the earliest entry that ends a sentence. Similar approaches may be used to ensure that the clip caption_frames segment encompasses at least a linguistic phrase or larger units such as a paragraph.

In one example, the find_partial_caption_frames( ) function searches for caption frames that are partially overlapped by a match region but are not sufficient to be included in the output. Then, add_additional_match_data( ) function adds any additional overlap from other regions. If the sum of overlapped regions transgresses a configurable threshold defined for inclusion of a caption frame, the caption frame is included in the output. This functionality is useful, for example, in the case where a caption frame is cut into two or more parts due to a word or words being edited out of the derived content (e.g., clip reel), or where a feature abnormality (e.g. added noise or extra sounds) causes one or more small segments within the caption frame times to have not been successfully matched to the reference template.

In one example where the derived content includes metadata other than caption frames, the find_caption_frames( ) function and the find_partial_caption_frames( ) function may be replaced or supplemented by a find_metadata_elements( ) function which operates similarly to the find_caption_frames( ) function and the find_partial_caption_frames( ) function, but extracts one or more relevant portions of other synchronized metadata, such as subtitles, semantic tagging, advertising, or other events that rely on the time alignment produced in the act 908.

In another example, the synchronization engine may receive a request, e.g. by a parameter supplied to the API call, that all times in the region.parent_times array be offset by a constant value prior to invoking the find_caption_frames( ) function and the find_partial_caption_frames( ) function. Alternatively, the request may indicate that this offset should vary as the times in the region.parent_time array increase. This functionality is useful when the transcription or captions for the reference media file are generated outside of the transcription system. Often, such externally produced captions or transcriptions will have a time-offset characteristic of manual captioning systems, particularly when the manual captions were created "live" as the original television show was being broadcast.

In another example, the synchronization engine may generate a synchronized transcription of the derived content using a process illustrated by lines 200-245 of the Pseudo-Code Listing.

Note that the scale computed at line 226 will always be one, except when the alignment procedure executes dynamic time warping. As such, this scaling may be excluded from the implementation when dynamic time warping alignment strategies are not used.

In act 912, the synchronization engine generates the confidence document described above and stores the document and the synchronized derived content in the market data storage. Where the synchronized derived content includes transcription information, the synchronization engine may submit the transcription information to other components of the transcription system to generate captions and caption placements, as described in the "Intelligent Captions" application and the "Automated Caption Positioning" application. Alternatively, the automatic synchronization request may include a parameter requesting that the current caption frames be honored, in which case the synchronization engine does not reframe the captions. After execution of the act 912, the process 900 ends.

Process in accord with the process 900, generate synchronized derived content is available to customers for download.

Processes 400 through 900 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a transcription system configured according to the examples and embodiments disclosed herein.

Synchronization Process Example

Figure 10:
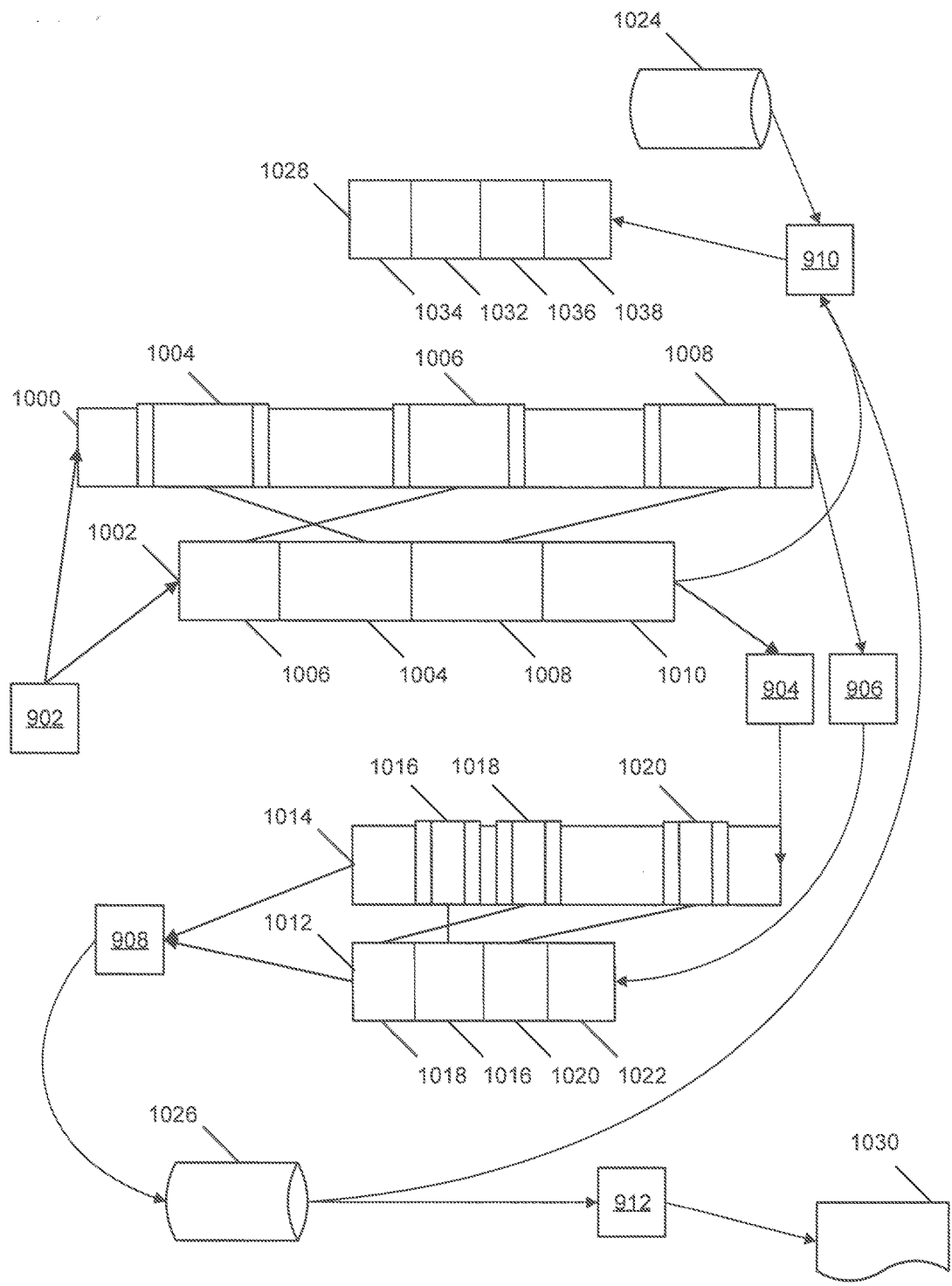
FIG. 10 is an input-output diagram illustrating a process for synchronizing reference content with derived content.

Another example of a synchronization engine (e.g., the synchronization engine 138) executing a synchronization process (e.g., the synchronization process 900) will now be described with reference to FIG. 10. The illustration of FIG. 10 includes a media file 1000, content 1002 derived from the media file 1000, a reference template 1014, a derived content template 1012, synchronization information 1024, alignment information 1026, synchronized derived content 1028, and a confidence document 1030.

The derived content 1002 may be a clip or clip reel, as described above. As shown in FIG. 10, the media file 1000 includes media portions 1004, 1006, and 1008. The derived content 1002 includes copies of the media portions 1004, 1006, 1008, and an additional media portion of content 1010. The reference template 1014 includes feature vectors descriptive of the media file 1000. These feature vectors include feature vector sets 1016, 1018, and 1020, which are descriptive of the media portions 1004, 1006, and 1008. The derived content template includes copies of the feature vector sets 1016, 1018, and 1020. In addition, the derived content template includes feature vector set 1022, which includes feature vectors descriptive of the additional portion of content 1010. The synchronization information 1024 includes time-coded or frame-coded transcription information and time-coded or frame-coded caption frames. The alignment information 1026 specifies a mapping between elements of the derived content 1002 and elements of the media file 1000.

In this example, the synchronization engine first executes the act 902 to identify the location of the media file 1000 and the derived content 1002. Next, the synchronization engine executes the act 904 to generate a derived content template 1012 from the derived content 1002 and executes the act 906 to generate a reference template 1014 from the media file 1000. Each of the derived content template 1012 and the reference template 1014 includes a set of feature vectors descriptive of the media it subsumes.

Next, the synchronization engine executes the act 908 to align the derived content template 1012 with the reference template 1014 and generate alignment information 1026. The synchronization engine may be perform the alignment by executing the place and prune procedure, the partition and place procedure, or the seed and grow procedure.

Where the synchronization engine executes the place and prune procedure, the synchronization first aligns the derived content template 1012 to the reference template 1014 such that the copy of the feature vector set 1018 within the derived content template 1012 is aligned with the feature vector set 1018 within the reference template 1014. Next, the synchronization engine prunes the copies of the feature vector sets 1016, 1020, and 1022 from the derived content template 1012. After completing this pruning, the synchronization engine aligns the remainder of the derived content template 1012 with the reference template 1014 such that the copy of the feature vector set 1016 within the derived content template 1012 is aligned with the feature vector set 1016 within the reference template 1014. Next, the synchronization engine prunes the copies of the feature vector sets 1020 and 1022 from the derived content template 1012. After completing this pruning, the synchronization engine aligns the remainder of the derived content template 1012 with the reference template 1014 such that the copy of the feature vector set 1020 within the derived content template 1012 is aligned with the feature vector set 1020 within the reference template 1014. Next, the synchronization engine prunes the copy of the feature vector set 1022 from the derived content template 1012. After completing this pruning, the synchronization engine attempts to align the remainder of the derived content template 1012 (i.e., the feature vector set 1022) with the reference template 1014, but is unable to do so because the feature vector set 1022 is not located within the reference template. Finally, with no additional template elements within the remainder of the derived content to align, the synchronization engine terminates the place and prune procedure.

Where the synchronization engine executes the partition and place procedure, the synchronization first partitions the derived content template 1012 into template elements with a width of 1 second. Next, the synchronization engine iteratively attempts to align each template element with the reference template 1014 until an attempt to align has been made for all template elements. In this example, the synchronization engine fails to align all template elements within the additional feature vector set 1022 because, in each case, a metric that indicates a likelihood of a match fails to exceed a predetermined threshold value.

Where the synchronization engine executes the seed and grow procedure, the synchronization engine first partitions the derived content template 1012 into template elements with a width of 1 second. Next, the synchronization engine attempts to align a first seed (e.g., the first template element) with the reference template 1014. If successful, the synchronization engine grows the first seed backwards and forwards until a metric that indicates the likelihood of a match indicates a decreased likelihood of proper alignment. Next, the synchronization engine repeats the align and grow actions described above for the remaining template elements until attempts to align have been made for all template elements. After the synchronization engine has attempted to align all of the template elements, it assigns any template element associated with to two or more seeds to a single seed. In this example, the synchronization engine fails to align all template elements within the additional feature vector set 1022 because, in each case, a metric that indicates a likelihood of a match fails to exceed a predetermined threshold value.

Next, the synchronization engine executes the act 910 to generate synchronized derived content 1028 using the alignment 1026, synchronization information 1024, and the derived content 1002. In this example, the media portions 1034, 1032, and 1036 are respectively associated with sets of transcription and caption information from the synchronization information 1024 that are, in turn, respectively associated with media portions 1006, 1004, and 1008. Finally, the synchronization engine executes the act 912 to generate the confidence document 1030 using the alignment information 1026. Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Pseudo-Code Listing

```
1 # The alignment_array is the output of this act:
2 # NULL values indicate unaligned regions of the clip:
3 alignment_array=Array.new(full_clip_length, NULL)
4 # A constant to determine how finely to prune at lines 52 and 81:
5 Prune_Increment=1
6 # The reference template is produced in the act 906:
7 full_reference_length=reference_template.length
8 # The clip_template is produced in act 904:
9 full_clip_length=clip_template.length
10 # This list of clips, with offsets into the original clip_template,
11 # can grow during pruning from the left and right below:
12 clips_to_align=[[clip_template, 0]]
13 # Entry point to aligning all remaining clips:
14 TAG NEXT_CLIP
15 if clips_to_align.empty? {
16 # Done aligning. This is the act 910:
17 GOTO CREATE_CLIP_TRANSCRIPT} # End of if at 15
18 # The first clip_template to align, along with its offset into the
19 # original clip_template:
20 clip_template, clip_offset=clips_to_align.shift
21 clip_length=clip_template.length
22 # Allocate an array of distances, long enough to hold all potential
23 # alignments between the reference_template and this clip_template.
24   average_distances=Array.new((full_reference_length–clip_length),
     MAXIMUM_FLOATING_POINT_VALUE)
25 reference_start_index=0
26 # Slide the clip_template along the reference_template computing the
27 # average distance, filling in the average_distances array at each
28 # offset:
29 while (reference_start_index<=(full_reference_length-clip_length)) {
30 # Skip any potential alignments that already have non-NULL values
31 next unless alignment_array[reference_start_index..reference_start_index+clip_length].contains_all(NULL)
32 average_distances[reference_start_index]=
    ComputeDistance(clip_template, reference_template,
      reference_start_index)/clip_length
35 references_start_index+=1} # End of while at 29
36 best_distance=average_Distances.array_min
37   alignment_start_index=average_distance.index_where (best_distance)
38   alignment_end_index=alignment_start_index+clip_length
39 clip_start_index=clip_offset
```

40 clip_end_index=clip_start_index+clip_length
41 # Initialize left/right sub_clips, which will potentially be produced
42 # by pruning from the current clip_template:
43 left_sub_clip_template=[ ]
44 left_clip_offset=clip_offset
45 right_sub_clip_template=[ ]
46 right_clip_offset=clip_end_index
47 # In this block, prune from the left of the clip_template as long
48 # as the sub_distance is at least as good (small) as the best_distance
49 # so far.
50 # Pruned frames go into the left_clip_template, to be added to the
51 # clips_to_align for aligning later.
52 TAG LEFT_PRUNE
53 i=0
54 while ((i<PruneIncrement) && (clip_template.length>PruneIncrement)) {
55 # prune a frame from clip_template and append it to the left_sub_clip
56 left_sub_clip_template<<clip_template.shift(i)
57 i+=1} # End of while at 54
58 sub_distance=ComputeDistance(clip_template, reference_template,
   alignment_start_index+PruneIncrement)/clip_template.length
59 if (sub_distance>best_distance) {
60 # Pruned too far, so restore the pruned frames to the clip_template
61 i=0
62 while (i<PruneIncrement) {
clip_template.unshift(left_sub_clip_template[i])
i+=1} # End of while at 62
65 if (!left_sub_clip_template.empty?) {
66 # If there are any frames in the left_sub_clip_template,
append this clip (and its offset) to clips_to_align:
clips_to_align<<[left_sub_clip_template, left_clip_offset] }
GOTO RIGHT_PRUNE} # End of if at 65
70 else {
71 # Keep pruning:
72 best_distance=sub_distance
73 alignment_start_index+=PruneIncrement
74 clip_start_index+=PruneIncrement
75 left_clip_offset+=PruneIncrement
76 GOTO LEFT_PRUNE] # End of if-else at 59-70
77 # In this block, prune from the right of the clip_template as long
78 # as the sub_distance is at least as good (small) as the best_distance so
79 # far. Pruned frames are prepended to the right_clip_template, to be added
80 # to the clips_to_align for aligning later.
81 TAG RIGHT_PRUNE
82 i=alignment_end_index
83 while (i>alignment_end_index-PruneIncrement && clip_template.length>
   PruneIncrement) {
84 # prune a frame from clip_template and push it on the front of the
85 # right_sub_clip
86 right_sub_clip_template.push(clip_template.pop(i))
87 i−=1} # End of while at 83
88 sub_distance=ComputeDistance(clip_template, reference_template,
   alignment_start_index)/clip_template.length
89 if (sub_distance>best_distance) {
90 # Pruned too far, so restore the pruned frames to the clip_template
91 i=alignment_end_index
92 while (i>alignment_end_index-PruneIncrement) {
93 clip_template.push(right_sub_clip_template.pop(i))
94 i−=1} # End of while at 92
95 if (!right_sub_clip_template.empty?) {
96 # If there are any frames in the right_sub_clip_template, append this
97 # clip (along with its offset) to clips_to_align:
98 clips_to_align<<[fight_sub_clip_template, right_clip_offset]}
99 right_sub_clip_template=[ ]
100 GOTO FILL_IN_ALIGNMENTS} # End of if at 95
101 else {
102 best_distance=sub_distance
103 alignment_end_index−=PruneIncrement
104 clip_end_index−=PruneIncrement
105 right_clip_offset−=PruneIncrement
106 GOTO RIGHT_PRUNE} # End of if-else at 89-101
107 # Now fill in the alignment_array with the alignment between the
108 # pruned clip and the reference:
109 TAG FILL_IN_ALIGNMENTS
110 i=clip_start_index
111 j=alignment_start_index
112 while (i<clip_end_index) {
113 alignment_array[i]=j
114 i+=1
115 j+=1}
116 # Go back to align any remaining clips.
117 GOTO NEXT_CLIP
201 TAG CREATE_CLIP_TRANSCRIPT
202 # The scale factor to convert alignment indices to transcript begin/end
203 # times, in msec. This is the feature vector sampling rate in acts 3 & 4:
204 SampleRate=10
205 # An array representing the synchronized transcript for the media file
206 # is accessed from the database. It is a sequence of [token, begin, end]:
207 original_transcript=DBGet("transcript", media_file_id)
208 # The output transcript will be a sequence of [token, begin, end]:
209 transcript=[ ]
210 i=0
211 # This guarantees that we will start a new entry in the transcript
212 # at the beginning of the while loop:
213 previous_reference_index=−2
214 current_begin_msec=current_end_msec=0
215 while (i<alignment_array.length) {
216 reference_index=alignment_array[i]
217 if (reference_index !=(previous_reference_index+1)) {
218 if (current_end_msec>current_begin_msec) {
219 TAG ADD_TO_TRANSCRIPT
220 # Locate the tokens from the original transcript and add them
221 # with appropriate timing offset/scaling to the output transcript:
222 output_dur=current_end_msec−current_begin_msec
223 entries=FindTranscriptEntries(original_transcript,
   current_begin_msec, current_end_msec)
224 reference_msec=reference_index*SampleRate
225 original_dur=entries.last.third−reference_msec

```
226 scale=output_dur/original_dur
227 for (token,begin,end) in entries {
228   xbegin=((begin−reference_msec)*scale)+current_begin_msec
229   xend=((end−reference_msec)*scale)+current_begin_msec
230 transcript<<[token, xbegin, xend] # End of for at 226
231 } # End of if at 218
232 # Beginning of new contiguous clip:
233 current_begin_msec=current_end_msec=reference_index*SampleRate
234 if (reference_index==alignment_array.last)
235 GOTO FINISHED
236 } # End of if at 217
237 else {
238 # Continue the current clip
239   current_end_msec=reference_index*SampleRate} # End of else at 238
240 previous_reference_index=reference_index} # End of while at 215
241 # Done with alignment array; need to finish the last clip:
242 reference_index=alignment_array.last
243 GOTO ADD_TO_TRANSCRIPT
244 TAG FINISHED
245 # The transcript now corresponds to the clip reel
301 # Returns an array of pairs[start_index, end_index], indices into
302 # the clip reel
303        subclip_offsets=generate_subclip_offsets(clip_reel_template)
304 num_subclips=subclip_times.length
305 match_likelihoods=Array.new(num_subclips)
306 reference_length=reference_template.length
307 all_offsets=(−reference_length+1)..(reference_length−1)
308 # For each subclip, store an array of match likelihoods at each offset
309 # into the reference template.
310 for ii=0 to num_subclips−1
311 match_likelihoods [ii]=Array.zeros(all_offsets.length)
312   subclip=subclip_reel_template[subclip_times[ii].first..subclip_times[ii].last]
313 # Each offset is the number of samples to shift the subclip start
314 # to a putative sample start in the reference template
315   possible_offsets=(−subclip_times[ii].first)..(reference_length−
    subclip_times[ii].last)
316 # For each possible offset, compute a match score
317 match_likelihoods[ii][possible_offsets]=
    detect_match_likelihood(subclip, reference_template)
318 end # End of for at 310
319 # Reinforce peaks that are consistent with peaks from neighboring subclips
320   match_likelihoods=consecutivity_filter(match_likelihoods)
321 # determine final placement of each subclip
322 subclip_placements=Array.new(num_subclips)
323 for ii=0 to num_subclips-1
324   subclip_placements[ii]=match_likelihoods[ii].find_max_index
325 end
326 # Convert to alignment_array format
327 alignment_array=Array.new(full_clip_length)
328 for ii=0 to num_subclips−1
329 placement=subclip_placements[ii]
330 subclip_start=subclip_offsets[ii].first
330 n_indices=subclip_offsets[ii].second−subclip_start
331 i=subclip_start+placement
332 while (n_indices>0)
333 alignment_array[placement]=i
334 placement+=1
335 i+=1
336 n_indices−=1
337 end # End of while at 332
338 end # End of for at 328
339 GOTO CREATE_CLIP_TRANSCRIPT
401 # Returns an array of contiguous regions in the clip reel and the associated matched time points
402 # if any, in the full-length media file
403 current_index=0
404 hyp_regions=Array.empty
405 while current_index<full_template.length
406   (start, end)=find_next_clip_segment(clip_template, start_at =current_index)
407   seeds=find_matches(full_template, clip_template, [start, end])
408 for seed in seeds
409       growth=expand_match_forwards_and_backwards(full_template, clip_template, seed)
410 hyp_regions.append(growth)
411 end
412 current_index=rightmost_index(hyp_regions)
413 end
414 regions=select_best_arrangement(hyp_regions)
499 partial_entries=Array.empty #keep track of frames that span multiple matched regions
500 for region in matched_regions
501   entries=find_caption_frames(parent_caption_frames, region.parent_times)
502     partial_entries=add_additional_match_data(entries, region.parent_times)
503   entries.append(extract_successful_partials(partial_entries))
504   output=shift_entries(entries, region.parent_times, region.child_times)
505 output_transcript.add_entries(output)
506 partial_but_excluded_entries=find_partial_caption_frames(parent_caption_frames, region.parent_times)
507 end
```

What is claimed is:

1. A system for creating synchronized content, the system comprising:

a memory;

at least one processor coupled to the memory; and a synchronization engine component executable by the at least one processor and configured to:

locate a media file associated with synchronization information that associates at least one portion of the media file with at least one portion of a transcription product;

locate at least one clip derived from the media file associated with the at least one portion of the transcription product via the synchronization information;

generate a reference template including one or more reference features representative of the media file associated with the at least one portion of the transcription product via the synchronization information;

generate a derived content template including one or more content features representative of the at least one clip derived from the media file associated with the at least one portion of the transcription product via the synchronization information;

align the derived content template with the reference template at least in part by matching the one or more reference features to the one or more content features to create alignment information; and generate the synchronized content based on the at least one clip, the alignment information, and the synchronization information, the synchronized content including one or more portions of the transcription product.

2. The system according to claim 1, wherein the synchronization information includes information descriptive of at least one of a final transcription, a draft transcription, a caption frame, and a caption position.

3. The system according to claim 1, wherein the synchronization information includes at least one of time codes and frame codes.

4. The system according to claim 1, further comprising a customer interface component configured to import the synchronization information from a system distinct from the system.

5. The system according to claim 1, further comprising a market engine component, wherein the synchronization engine component is further configured to transmit a request to the market engine component to generate the synchronization information.

6. The system according to claim 1, wherein the derived content template includes a first plurality of feature vectors and the reference template includes a second plurality of feature vectors.

7. The system according to claim 6, wherein the synchronization engine component is configured to align the derived content template with the reference template where a similarity metric between the first plurality of feature vectors and the second plurality of feature vectors transgresses at least one threshold value.

8. The system according to claim 7, wherein the similarity metric is at least one of a correlation coefficient and an average distance.

9. The system according to claim 8, wherein the first plurality of feature vectors includes a first group of feature vectors and a third group of feature vectors, the second plurality of feature vectors includes a second group of feature vectors and a fourth group of feature vectors, and the at least one threshold value is a first distance that is less than a second distance, the first distance being between the first group and the second group, the second distance being between the third group and the fourth group.

10. The system according to claim 8, wherein the first plurality of feature vectors includes a first group of feature vectors and a third group of feature vectors, the second plurality of feature vectors includes a second group of feature vectors and a fourth group of feature vectors, and the at least one threshold value is a first correlation coefficient that is greater than a second correlation coefficient, the first correlation coefficient being between the first group and the second group, the second correlation coefficient being between the third group and the fourth group.

11. The system according to claim 6, wherein the synchronization engine component is configured to align the derived content template with the reference template at least in part by partitioning the derived content template into a plurality of template elements and aligning a template element of the plurality of template elements with the reference template where a similarity metric between the first plurality of feature vectors and the second plurality of feature vectors transgresses at least one threshold value.

12. The system according to claim 11, wherein each element template of the plurality of template elements spans a configurable length.

13. The system according to claim 11, wherein the plurality of template elements includes at least one other template element comprising a third plurality of feature vectors, the reference template includes a fourth plurality of feature vectors, and the synchronization engine component is configured to align the derived content template with the reference template at least in part by concatenating the at least one other template element to the template element where a similarity metric between the third plurality of feature vectors and the fourth plurality of feature vectors transgresses the at least one threshold value.

14. The system according to claim 13, wherein the synchronization engine component is further configured to concatenate the at least one other template element to the template element in a location before to the template element.

15. The system according to claim 13, wherein the synchronization engine component is further configured to concatenate the at least one other template element to the template element in a location after the template element.

16. The system according to claim 1, wherein the synchronization engine component is further configured to initiate generation of caption frames based on the synchronized content.

17. The system according to claim 16, wherein the synchronization engine component is further configured to initiate generation of caption positioning information based on the caption frames.

18. The system according to claim 17, wherein the at least one clip includes added content omitted from the media file and the synchronization engine component is further configured to initiate generation of at least one of a synchronized transcription, caption frames, and caption positioning information for the added content.

19. The system according to claim 1, wherein the synchronization engine component is further configured to generate a confidence document including a score indicating whether the synchronized content is correct.

20. The system according to claim 19, wherein the synchronization engine component is further configured to determine whether the score transgressed a threshold value and to either transmit the synchronized content in response to determining that the score transgressed the threshold value or initiate editing of the synchronized content in response to determining that the score transgressed the threshold value.

21. A method for creating synchronized content using a computer system, the method comprising:

executing a synchronization engine component;

locating, by the synchronization engine component, a media file associated with synchronization information that associates at least one portion of the media file with at least one portion of a transcription product;

locating, by the synchronization engine component, at least one clip derived from the media file associated with the at least one portion of the transcription product via the synchronization information;

generating, by the synchronization engine component, a reference template including one or more reference features representative of the media file associated with the at least one portion of the transcription product via the synchronization information;

generating, by the synchronization engine component, a derived content template including one or more content features representative of the at least one clip derived from the media file associated with the at least one portion of the transcription product via the synchronization information;

aligning, by the synchronization engine component, the derived content template with the reference template at least in part by matching the one or more reference features to the one or more content features to create alignment information; and generating, by the synchronization engine component, the synchronized content based on the at least one clip, the alignment information, and the synchronization information, the synchronized content including one or more portions of the transcription product.

22. A non-transitory computer readable medium storing sequences of computer executable instructions for creating synchronized content, the sequences of computer executable instructions including instructions that instruct at least one processor to:

execute a synchronization engine component;

locate, by the synchronization engine component, a media file associated with synchronization information that associates at least one portion of the media file with at least one portion of a transcription product;

locate, by the synchronization engine component, at least one clip derived from the media file associated with the at least one portion of the transcription product via the synchronization information;

generate, by the synchronization engine component, a reference template including one or more reference features representative of the media file associated with the at least one portion of the transcription product via the synchronization information;

generate, by the synchronization engine component, a derived content template including one or more content features representative of the at least one clip derived from the media file associated with the at least one portion of the transcription product via the synchronization information;

align, by the synchronization engine component, the derived content template with the reference template at least in part by matching the one or more reference features to the one or more content features to create alignment information; and generate, by the synchronization engine component, the synchronized content based on the at least one clip, the alignment information, and the synchronization information, the synchronized content including one or more portions of the transcription product.

\* \* \* \* \*